(12) United States Patent
Hamaguchi et al.

(10) Patent No.: US 7,302,091 B2
(45) Date of Patent: Nov. 27, 2007

(54) METHOD AND APPARATUS FOR DETERMINING DEFECT DETECTION SENSITIVITY DATA, CONTROL METHOD OF DEFECT DETECTION APPARATUS, AND METHOD AND APPARATUS FOR DETECTING DEFECT OF SEMICONDUCTOR DEVICES

(75) Inventors: Akira Hamaguchi, Kanagawa (JP); Takamitsu Nagai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 676 days.

(21) Appl. No.: 10/687,828

(22) Filed: Oct. 20, 2003

(65) Prior Publication Data

US 2004/0151362 A1 Aug. 5, 2004

(30) Foreign Application Priority Data

Oct. 18, 2002 (JP) .............................. 2002-305157

(51) Int. Cl.
*G06K 9/00* (2006.01)
(52) U.S. Cl. .................. 382/145; 382/143; 382/144
(58) Field of Classification Search ................ 382/141, 382/143–152; 348/86, 87, 125, 126; 356/237.1, 356/237.4, 237.5
See application file for complete search history.

(56) References Cited

U.S. PATENT DOCUMENTS

| 6,841,403 | B2 * | 1/2005 | Tanaka et al. ................ 438/14 |
| 7,037,735 | B2 * | 5/2006 | Noguchi et al. .............. 438/18 |
| 2003/0058444 | A1 * | 3/2003 | Nara et al. ................... 356/394 |

FOREIGN PATENT DOCUMENTS

| JP | 2001-337047 | 12/2001 |
| JP | 2002-267615 | 9/2002 |
| JP | 2003-59991 | 2/2003 |

* cited by examiner

*Primary Examiner*—Vikkram Bali
(74) *Attorney, Agent, or Firm*—Finnegan, Henderson, Farabow, Garrett & Dunner, L.L.P.

(57) ABSTRACT

A method of determining defect detection sensitivity data, comprises: taking image data from the desired surface areas of each of semiconductor devices, processing at least two of the image data through arithmetic operations and comparing the processed image data with a parameter of defect detection sensitivity substituted by predetermined threshold data to obtain information on defects in the desired areas at least in one-to-one correspondence with any of the image data arithmetically processed, repeating more than once the step of varying the parameter of the defect detection sensitivity to obtain the defect information, so as to obtain more than one sets of combination data on a value of the parameter of the defect detection sensitivity correlated with the defect information, processing more than one sets of the combination data to produce a mathematical function expressing a relation of the desired statistical data with the parameter of the defect detection sensitivity, the mathematical function being used to determine defect detection sensitivity data, the defect detection sensitivity data being used in obtaining the information on the defects in the desired surface areas of the semiconductor devices under defect inspection, and the defect detection sensitivity data defining an existence range of the defect information in the image data which are taken from the desired surface areas of each semiconductor device and which are arithmetically processed in the previous step.

26 Claims, 17 Drawing Sheets

METHOD AND APPARATUS FOR DETERMINING DEFECT DETECTION SENSITIVITY DATA, CONTROL METHOD OF DEFECT DETECTION APPARATUS, AND METHOD AND APPARATUS FOR DETECTING DEFECT OF SEMICONDUCTOR DEVICES

CROSS REFERENCE TO RELATED APPLICATIONS

This application is based upon and claims the benefit of priority from the prior Japanese Patent Application No. 2002-305157, filed on Oct. 18, 2002; the entire contents of which are incorporated herein by reference.

BACKGROUND OF THE INVENTION

The present invention relates to a method for determining defect detection sensitivity data, a control method of a defect detection apparatus, an apparatus of determining defect detection sensitivity data, and a method and apparatus for detecting defect of semiconductor devices.

It has been a significant matter of concern inspecting if semiconductor devices processed as required are defective in order to attain better yields and maintain the increased yields. Especially, the current semiconductor device manufacturing industry has been shifting its strategy from mass production of a restricted variety of items as represented by the production of semiconductor memories to reduced scale production of a great variety of items as in the production of logic circuits having short lives, and hence, it becomes a critical matter to efficiently perform the aforementioned semiconductor device defect inspections with the optimum sensitivity as much as possible.

Disclosed below is one of ways commonly taken to determine semiconductor devices as being defective from a defect of minute pattern shaped in wafer and a random defect found in unfinished crystalline phase of devices.

First, gathered are surface images of adjacent pairs of chips of the wafer or adjacent pairs of array blocks of a memory having cells deployed in matrix, which are produced into detectable format of optical images or electron-beam images. The detected images of the adjacent pairs of chips or cell array blocks are compared to one another to extract differences among them, and portions on a chip, for example, corresponding to the differences are discriminatively taken as defects of the chip.

More specifically, the differences are extracted by way of the filtering to eliminate noise from the obtained images of the adjacent pairs of the chips, and the succeeding counting of a uniqueness quantity (gray scale value) of each of pixels of the image. The uniqueness quantity of each pixel is compared with that of a counterpart image (e.g., these samples undergo subtraction). If the difference of the uniqueness quantities (gray scale values) is equal to a predetermined level (threshold value) or even higher, the pixel is discriminatively extracted as the difference.

However, such a method of detecting deficiencies of semiconductor devices has a requirement of setting an inspection apparatus with the aforementioned threshold value (inspection sensitivity) in advance, and a determination of the threshold value is a time consuming task. There is additional problem that the determined threshold value lacks reliability. These disadvantages in the prior art will be detailed below.

FIG. 24 is a flow chart illustrating a prior art method of setting the threshold value. With reference to FIG. 24, this prior art method will be described.

First, an arbitrary threshold value is set to the semiconductor device defect detection apparatus in advance (Step S101). Then, each of the pixels of a surface image taken for a targeted semiconductor device on an image pickup unit is converted in multi-level data to produce digitized image data (Step S102). The digitized image data is compared with another digitized image data obtained from the similar type of semiconductor device (e.g., an adjacent chip) on the single-pixel-at-a-time basis in the same manner as mentioned above, to detect differences of those digitized image data, and eventually, real portions of the semiconductor device corresponding to the differences are discriminatively determined as defects (Step S102). The defects are subjected to the sampling (Step S103) and then, undergo an eye inspection (review) by a human operator (Step S104). As a result of this inspection, it is checked if the defect detection level reaches the desired criteria on types and scales of the defects, that is, if the arbitrary threshold value is appropriate (Step S105). After the review, if the inspection level is satisfactory (YES at Step S105), the arbitrary threshold value preset is employed, or otherwise, if not (NO at Step S105), the procedural steps (Steps S101 to S105) are repeated from the setting of the threshold value to the review of the inspection level till it reaches the satisfactory inspection level.

As is recognized, the aforementioned manner of setting the threshold value may often have to repeat more than one set of steps starting with the setting of the arbitrary threshold value and terminated with the review of the inspection level till the determination of the threshold value, and inevitable is a time consuming task of trial and error till the eventual determination of the threshold level. In other words, the successful setting of the threshold value highly depends upon skills of a recipe planner (a person who determines factors including the threshold value), and it may take an unacceptably long time to obtain the threshold value and the required time for this task is often non-predictable.

There is additional disadvantage as mentioned below in this threshold value setting method, especially, in the step of defect review (Step S104 in FIG. 24). The defect review primarily includes a method of reviewing all the semiconductor devices judged as defective (total review) and a method of taking some samples from the defective semiconductor devices if there are so many (sampling review). The total review is more time consuming and not efficient, and the sampling review may leave the defective products unmarked to find a remarkable error in the determined threshold value, which often unavoidably leads to a re-correction of the threshold value.

To overcome the disadvantages, it has been necessary to provide an improved way of accurate quantitative setting of a threshold value to attain a reduced time high precision setting of the threshold value.

Semiconductor device mass production factories, which process numerous wafers of the same type, typically use a number of wafer inspection apparatuses for efficient inspection. However, such inspection apparatuses of the same type have their respective minor inherent peculiarities, and thus, it is undesirable to consistently use the same recipe (e.g., various requirements for each inspection such as the threshold value, an intensity of light directed to devices for image pickup, and so forth). This is why adjustments of components such as optics are necessary for the individual inspection apparatus with its own unique references. In general, since recipes are made in a non-quantitative fashion, a successful recipe highly depends upon how its planner is skilled, and such recipe making is a time consuming job. As mentioned above, it takes an extraordinarily long time to adjust optics of the inspection apparatus on the one-at-a-time basis; and this is a cause of varied performance in obtaining the results of the matching from one inspection apparatus to another.

The matching for the individual inspection apparatus will be exemplified as follows: First, more than one wafers, which have undergone the predetermined process, are inspected on an inspection apparatus to determine coordinates (defect coordinates) specifying defects detected in the wafer. The defect coordinates of the wafers are further examined to discriminatively extract master defect coordinates that are detected at an arbitrary detection rate or higher, and then, portions of the wafers corresponding to the master defect coordinates are counted to obtain the number of master defects and then saved. The sequence of tasks from detecting the defect coordinates of the wafers to saving the counted number of the master detects are repeated for the same wafers in the same fashion on the remaining inspection apparatuses. The results of the inspections on the inspection apparatuses are compared, and the inspection apparatuses have their respective optics regulated to have the same result on the master defects in number.

However, the wafers applied to the matching on the inspection apparatuses are standardized wafers prepared by a manufacturer of the inspection apparatuses and factory processed wafers, but are of different type from the inspection target wafers (the matching of and the types of the targeted wafers is impossible for various reasons such as a restriction of time). This way of the matching does not cover the thorough inspection of all wafers that should be inspected and does not satisfy the desired reliability.

It has been desired to carry out the matching on more than one inspection apparatuses with wafers of the same type as that of the inspection target wafers in a quantifying manner instead of the prior art time consuming matching method that causes the undesirably uneven matching results among the inspection apparatuses.

Furthermore, as also mentioned above, in the prior art recipe design for the inspection apparatuses, the fulfillment of the recipe highly depend upon the skills of its planner, and samples employed in the recipe is unsatisfactory in variation and number. Thus, the recipe designed in this way is not fully reliable and often lacks durability to noise (robustness). This is also a matter of concern in the standpoint of quality control (QC) of which orientation is periodical inspections and maintenance of the performance of the inspection apparatuses. This will be more detailed below.

FIG. 25 is a graph illustrating an example of the prior art inspection apparatus QC.

In the prior art inspection apparatus QC, the same sample is examined at predetermined time intervals (e.g., one-week intervals) with the same recipe, and a "fail or safe" test is discriminatively performed, depending upon if the result of the detection, namely, the total of defects is in a range of tolerance between the lower and upper limits of the number as in FIG. 25. If the detection result or the number of the defects is not in the range, the resolution is that the inspection apparatuses do not meet the standardized quality requirements and have to send for maintenance. As mentioned above, the fulfillment of the recipe depends upon the skills of the recipe planner, and as is often the case, any error factor cannot be negligible without leaving margin of the threshold value in the course of recipe planning. In such a case, an excessively large number of defects would be found to draw a conclusion that the inspection apparatuses actually meeting the quality requirements are numerically unsatisfied to conform to the standard. Thus, it has been an urgent matter of concern to provide the improved recipe planning, especially, the improved method of determining the threshold value to introduce and perform an appropriate inspection apparatus QC.

In the process lines of semiconductor devices at manufacturing plant, there are a variety of and a number of semiconductor manufacturing apparatuses for processes of wafers, and the semiconductor manufacturing apparatuses work with various process sequences for batch processing, multi-chamber processing, and so on. Hence, it is unavoidable that wafers having undergone various processes through the processes have lot-to-lot variations and wafer-to-wafer variations in the same lot. To avoid such variations, it is desired that the thorough inspection of all the wafers (total inspection) is carried out. Taking the cost and throughput into consideration, however, the total inspection of the wafers is hard to introduce. In typical practice, the upper limit in number of wafers the inspection apparatuses can deal with is predicted from a capacity of the apparatuses, and the inspection is performed to such as many a number of wafers as possible, although the number is limited, to reduce wafers skipping the inspection. For example, prior to the wafer inspection, a wafer-sampling plan is drafted based upon a statistical analysis of a manufacturing history of wafers to reduce the wafers overlooked without inspection with this solution, the wafer inspection still has a problem as mentioned below.

This wafer inspection is planned having great weight upon inspecting as many a number of wafers as possible with the limited number of inspection apparatuses, and the optimization of cost performance (or loss) is the second or third matter. A yield of the wafers is always varied, but factors of the; cost estimation such as the time interval from one inspection to the next (inspection frequency), the number of inspected wafers, and so forth, once determined, are never changed. Hence, a matter that cannot wait, is a tactic of automatically revising values of the cost factors, allowing for the optimized estimation of cost, in a quantifying manner.

SUMMARY OF THE INVENTION

According to a first aspect of the present invention, there is provided a method of determining defect detection sensitivity data, comprising:

taking image data from the desired surface areas of each of semiconductor devices, processing at least two of the image data through arithmetic operations and comparing the processed image data with a parameter of defect detection sensitivity substituted by predetermined threshold data to obtain information on defects in the desired areas at least in one-to-one correspondence with any of the image data arithmetically processed, repeating more than once the step of varying the parameter of the defect detection sensitivity to obtain the defect information, so as to obtain more than one sets of combination data on a value of the parameter of the defect detection sensitivity correlated with the defect information, processing more than one sets of the combination data to produce a mathematical function expressing a relation of the desired statistical data with the parameter of the defect detection sensitivity, the mathematical function being used to determine defect detection sensitivity data, the defect detection sensitivity data being used in obtaining the information on the defects in the desired surface areas of the semiconductor devices under defect inspection, and the defect detection sensitivity data defining an existence range of the defect information in the image data which are taken from the desired surface areas of each semiconductor device and which are arithmetically processed in the previous step.

According to a second aspect of the present invention, there is provided an apparatus of determining defect detection sensitivity data, comprising an image data pickup unit directing light or electron beam to the desired surface areas of each of semiconductor devices and receiving reflected light or electrons from the desired surface areas to pick up the image data, a first arithmetic operation unit processing at least two of the image data through arithmetic operations and comparing the processed image data with a parameter of defect detection sensitivity substituted by predetermined threshold data to obtain information on defects in the desired areas at least in one-to-one correspondence with any of the image data arithmetically processed, and repeating more than once the step of varying the parameter of the defect detection sensitivity to obtain the defect information, so as to obtain more than one sets of combination data on a value of the parameter of the defect detection sensitivity correlated with the defect information, and a second arithmetic operation unit processing more than one sets of the combination data to produce a mathematical function expressing a relation of, the desired statistical data with the parameter of the defect detection sensitivity, the mathematical function being used to determine defect detection sensitivity data, the defect detection sensitivity data being used in obtaining the information on the defects in the desired surface areas of the semiconductor devices under defect inspection, and the defect detection sensitivity data defining an existence range of the defect information in the image data which are taken from the desired surface areas of each semiconductor device and which are-arithmetically processed in the previous step.

According to a third aspect of the present invention, there is provided a method of detecting defects in semiconductor devices, comprising:

exploiting various data to produce a mathematical function expressing a relation of cost of manufacturing the semiconductor devices with parameters of cost factors including semiconductor device defect inspection conditions and influencing the cost, the various data being stored in a processing device database, a yield database, and an electric property database, respectively, the processing device database storing data related to processing devices used in manufacturing semiconductor devices, the yield database storing data related to yields of the semiconductor devices, and the electric property database storing data on the results of a tester inspection and data on the results of the matching of the tester inspection results with the defect information of the semiconductor devices, determining the cost factors through the mathematical function expressing the relation of the cost with the parameters of the cost factors, carrying out the semiconductor device defect inspection, relying on the cost factors and the defect detection sensitivity data fixed by an above-mentioned method, producing data on renovated yields from the information on defects detected by the semiconductor device defect inspection and the data on yields stored in the yield database, producing data on renovated results of the matching of the defect information with the results of a tester inspection, and using feedback data of the renovated yield data and the renovated matching result data to repeatedly produce a mathematical function expressing a relation of the cost with the parameters of the cost factors.

According to a fourth aspect of the present invention, there is provided a semiconductor device defect detection apparatus, comprising:

a processing device database storing data related to processing devices used in manufacturing semiconductor devices a yield database storing data related to yields of the semiconductor devices, an electric property database storing data on the results of a tester inspection and data on the results of the matching of the tester inspection results with the defect information of the semiconductor devices, a cost calculating unit exploiting the data stored in the processing device database, the yield database, and the electric property database, respectively, to produce a mathematical function expressing a relation of cost of manufacturing the semiconductor devices with parameters of cost factors including semiconductor device defect inspection conditions and influencing the cost, and determining the cost factors through the mathematical function expressing the relation of the cost with the parameters of the cost factors, a semiconductor device defect detection apparatus carrying out the semiconductor device defect inspection, relying on the cost factors and the defect detection sensitivity data fixed by the above-mentioned method, and yield data control unit producing data on renovated yields from the information on defects detected under the defect inspection by the semiconductor device defect detection apparatus and from the data on yields stored in the yield database, producing data on renovated results of the matching of the defect information with the results of a tester inspection, and transferring feedback data of the renovated yields and the renovated matching results to the cost calculating unit.

DETAILED DESCRIPTION OF THE INVENTION

Referring to the accompanying drawings, embodiments of the present invention will be described.

EMBODIMENT 1

Figure 1:
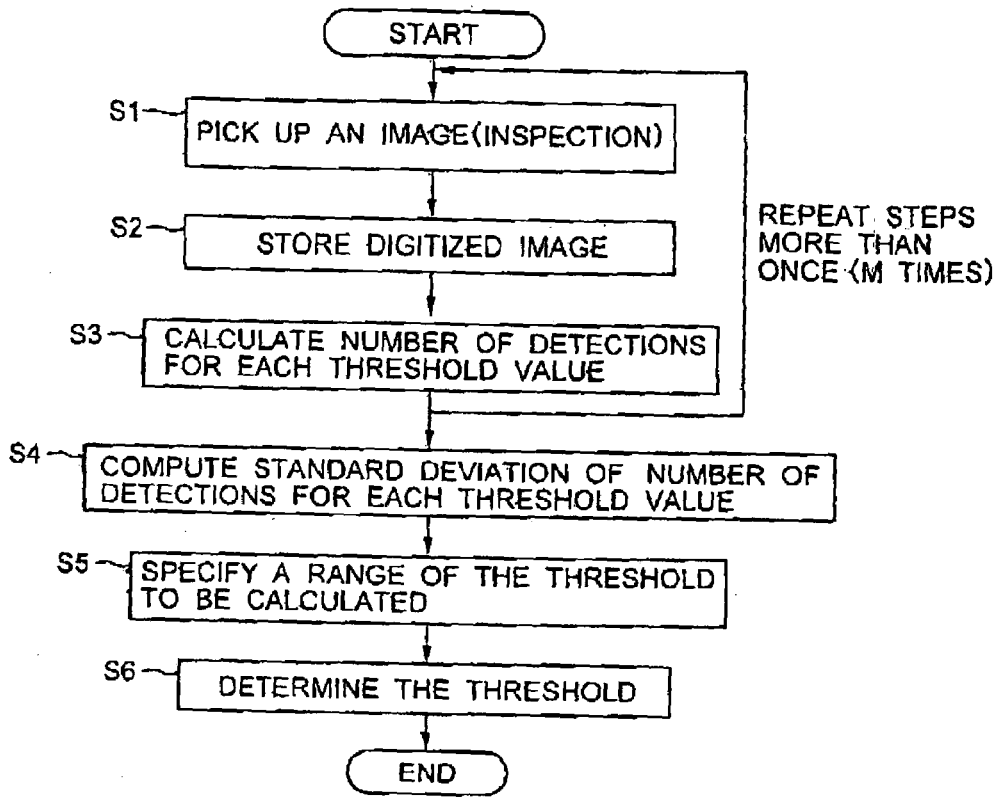
FIG. 1 is a flow chart illustrating an exemplary process of determining a threshold value in accordance with an embodiment of the present invention.
Figure 2:
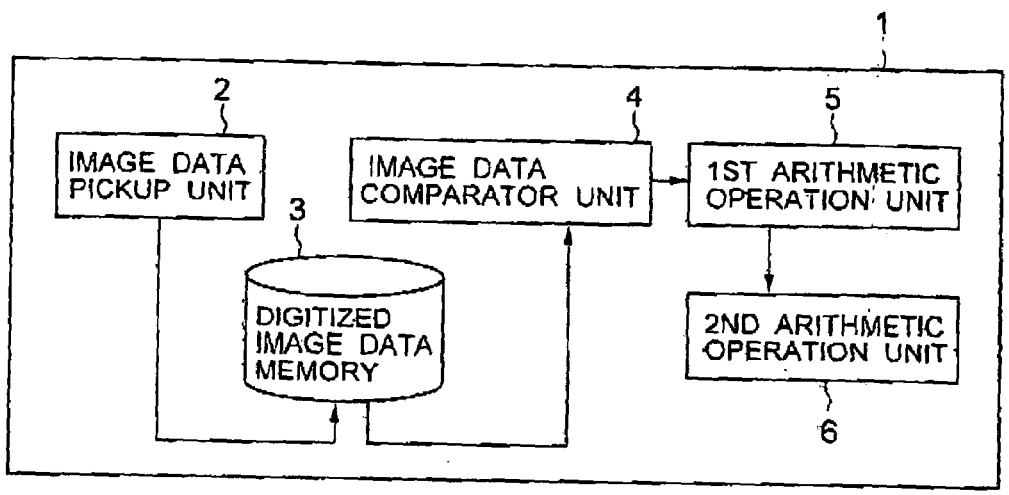
FIG. 2 is a diagram showing an example of a threshold value determining unit used in the process of determining the threshold value.

FIG. 1 is a flow chart illustrating an exemplary process of determining a threshold value in accordance with the present invention, and FIG. 2 is a diagram showing an example of a threshold value determining unit used in the process of determining the threshold value.

As can be seen in FIG. 1, the process of determining a threshold value includes steps of taking image data of surfaces of target semiconductor devices that should be inspected (Step S1), multi-leveling each pixel of the image data and storing the results as digitized image data in a memory (Step S2), using the digitized image data in the memory to calculate the number of defects of each semiconductor device in terms of each of parameters of threshold values (Step S3), using the calculation results in the previous step to compute a standard deviation of the number of detected defects in terms of each of the parameters of the threshold values (Step S4), using the computation results of the standard deviation to specify a range of the desired threshold value (Step S5), and using the results of the previous step to eventually determine the threshold value (Step S6).

As illustrated in FIG. 2, a threshold value determining unit 1 is comprised of an image data pickup unit 2 executing tasks of Steps S1 and S2 to obtain image data and store digitized image data as mentioned above, an image data memory 3 storing the digitized image data, an image data comparator unit 4 executing tasks of Step S3 to calculate the number of defects as mentioned above, a first arithmetic operation unit 5 executing a task of step S4 to calculate a standard deviation as mentioned above, and a second arithmetic operation unit 6 executing tasks of Steps S5 and S6 to specify a point of convergence of the standard deviation and to determine the threshold value, as mentioned above.

With reference to FIGS. 1 and 2, the aforementioned threshold value determining process will be detailed in order of the sequence of Steps S1 to S6.

The step of obtaining the image data (Step S1) will first be described.

This step is performed by the image data pickup unit 2 (see FIG. 2) to take image data of surfaces of target semiconductor devices that should be inspected. The step will be described in more detail below.

Figure 3:
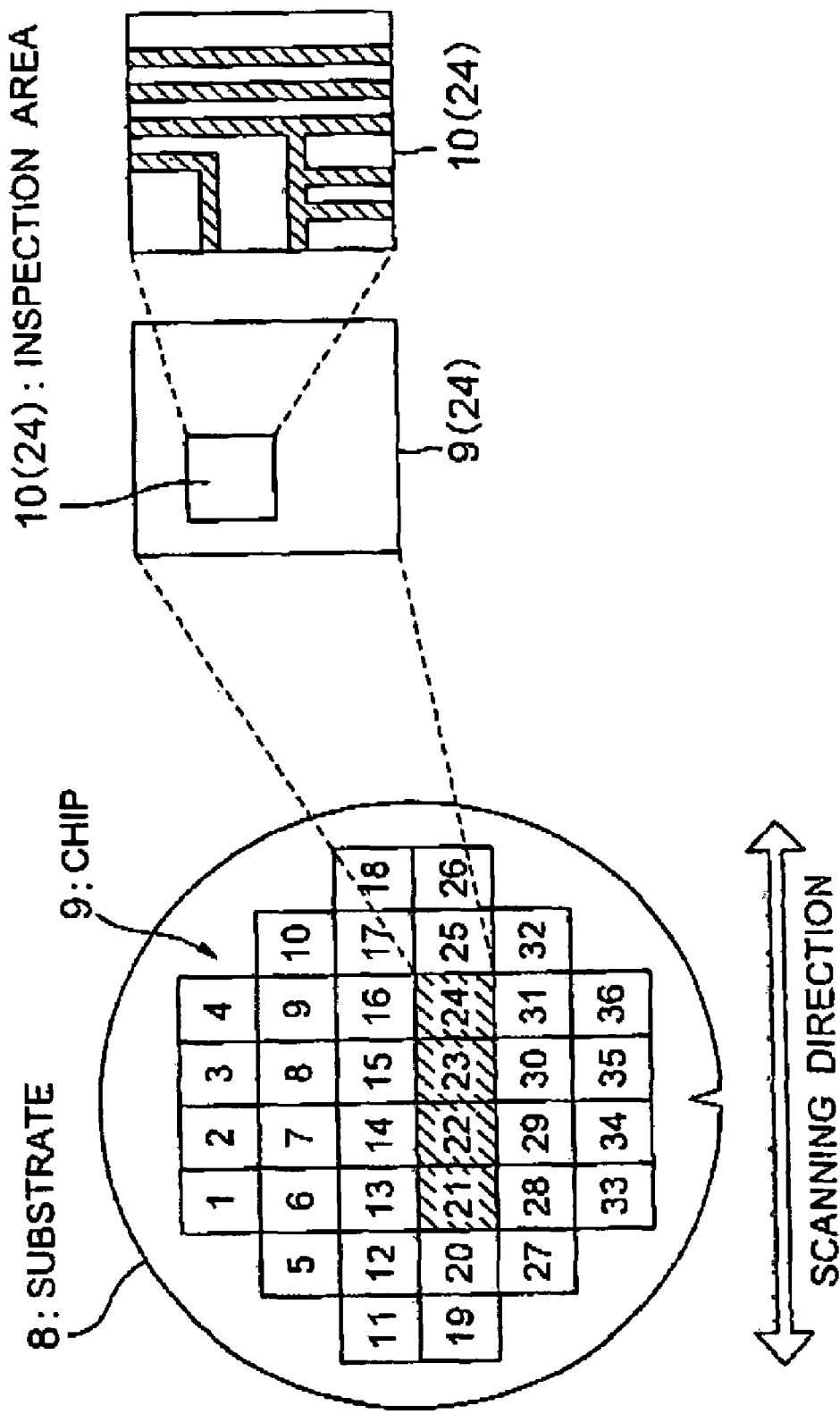
FIG. 3 depicts a wafer processed as required.

FIG. 3 depicts a substrate (wafer) 8 that has undergone a required process and has a number of chips (semiconductor devices) 9 built up thereon. Although, as will be recognized, there are thirty-six of the chips 9(1) to 9(36) incorporated in the wafer 8, a real wafer typically has more chips thereon. In this embodiment, only four of the chips 9(21) to 9(24) among the chips 9 are taken as target devices (a source of the image data) that should be inspected, simply by way of example. More specifically, as illustrated in FIG. 3, inspection areas 10(21) to 10(24) of part of the chips 9(21) to 9(24) are actual target areas of the inspection. The inspection areas 10(21) to 10(24) are scanned in a direction denoted in the drawing by a scanner such as a CCD sensor to get images of the inspection areas 10(21) to 10(24). An alternative to the CCD sensor used for image pickup of the inspection areas 10(21) to 10(24) is, for example, a scanning electron microscope. The inspection areas 10(21) to 10(24) are, for example, wiring regions as depicted in an enlarged form.

As has been described, in the step of obtaining image data, the images of parts of the chips 9(21) to 9(24), namely, of the inspection areas 10(21) to 10(24) on the wafer 8 are taken and their respective image data are gathered.

As can be seen in FIG. 1, the step of storing digitized image data (Step S2) will be detailed below.

This step of storing digitized image data includes converting the image data obtained by the image data pickup unit 2 (see FIG. 2) in the previous step (Step S1) into digitized image data to store them in the digitized image data memory 3. This step will be described in more detail below.

Figure 4:
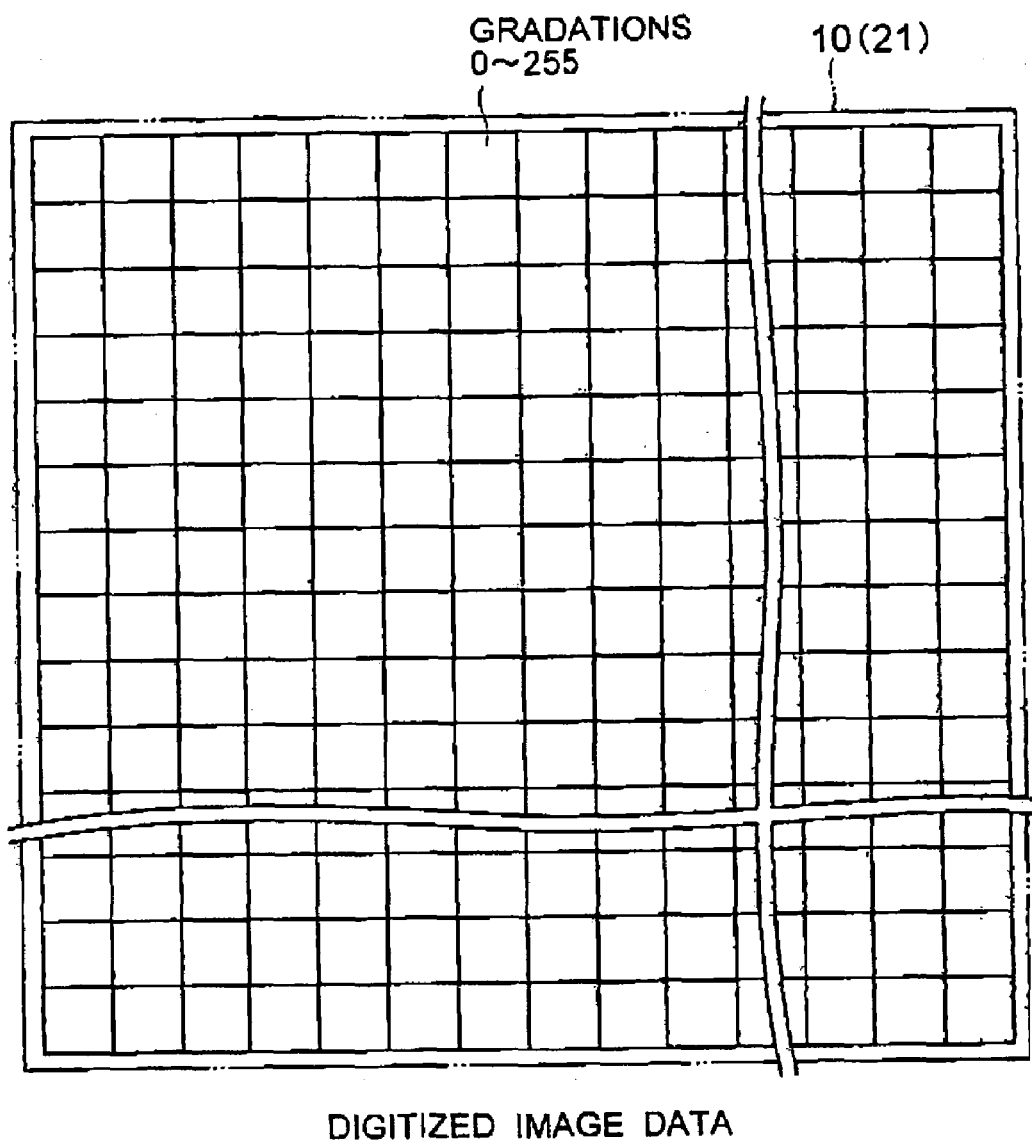
FIG. 4 shows an image data from an inspection area divided into numerous pixels each of which is digitized.

FIG. 4 shows the image data from the inspection area 10(21) divided into numerous pixels each of which is digitized.

As can be seen in FIG. 4, the pixels of the image data in the inspection area 10(21) are digitized in a range of a gradation value from 0 to 255, for example, and the image data of the pixels ate stored as digitized image data in the memory 3. At this time, other, data such as coordinates of the pixels on the wafer 8 are also stored. Similarly, the image data of the remaining inspection areas 10(22) to 10(24) are digitized on the single pixel basis and then stored in the digitized image data memory 3.

Then, returning to FIG. 1, the step of calculating the number of detected defects (Step S3) will be described below.

In this step of calculating the number of detected defects, the digitized image data of the inspection areas 10(21) to 10(24) stored in the digitized image data memory 3 in the previous step (Step S2) are used to calculate the number of defects existing in the inspection areas 10(21) to 10(24) by means of die matching, for example. In this case, the threshold value mentioned later is varied in 256 multi-levels from 0 to 255 in accord with the aforementioned gradation values 0 to 255 to calculate the number of defects of the inspection areas 10(21) to 10(24) for each of the threshold value. This step is executed by the image data comparator unit 4. More detailed explanation will be provided below.

Above all, particulars of the method of detecting defects in the fashion of the die matching will be described.

Figure 5:
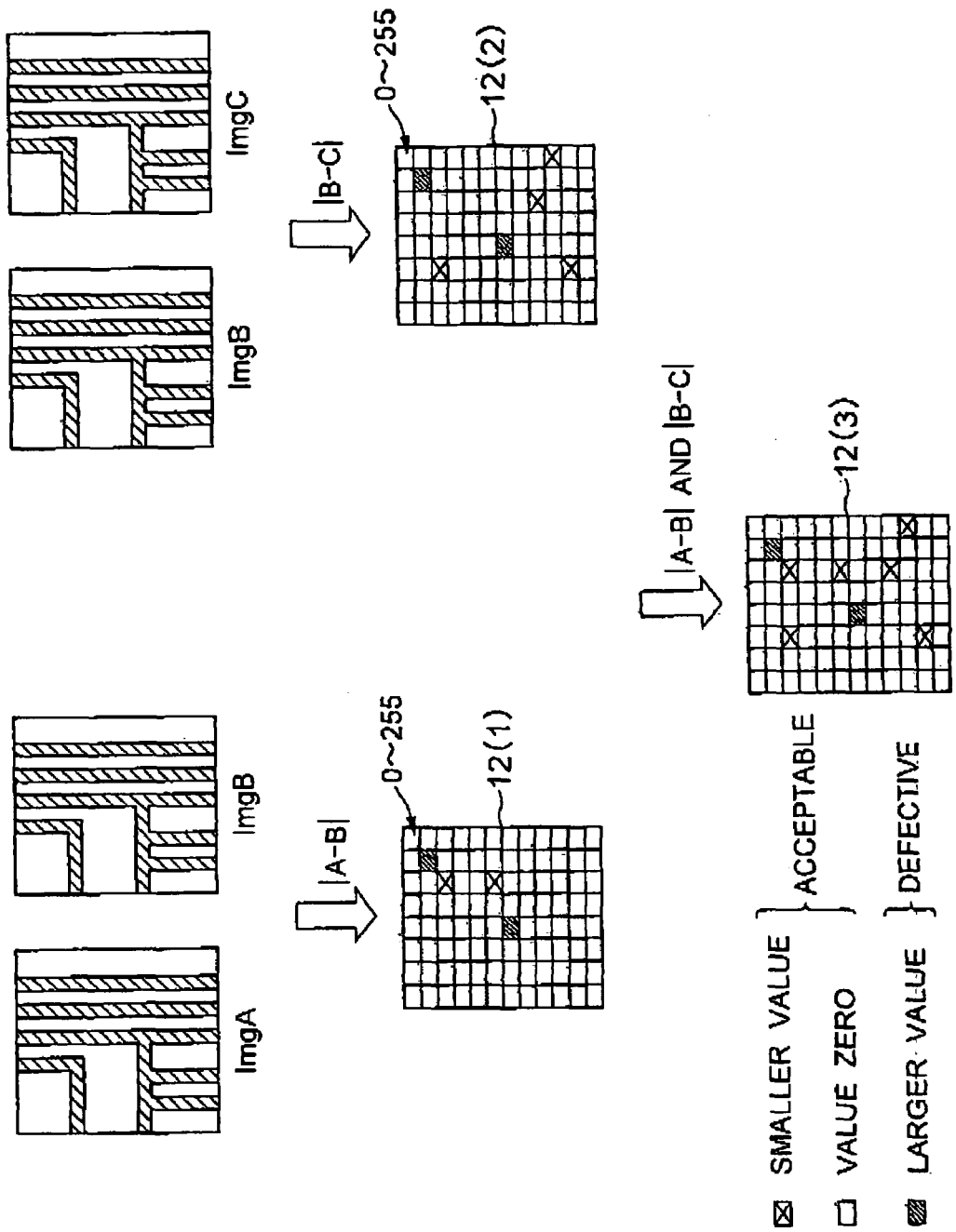
FIG. 5 is a diagram illustrating the matching of dies.

FIG. 5 is a diagram illustrating the die matching. As can be seen in FIG. 5, it is assumed that image, data A to C of the inspection areas A to C (not shown) have already been gathered. The image data A to C are made of numerous pixels each of which has any of gradation values 0 to 255. With such a presumption, the image data A to C are used to detect defects in the inspection area B.

First, as illustrated in FIG. 5, the gradation values of the pixels of the image data A and B are subtracted on the each-pixel-from-its-counterpart basis between two of the image data, and absolute values of the subtraction results (|A-B|) are obtained. The absolute values of the subtraction results among the pixels are shown in Cell Table 12(1) in FIG. 5 where cells as many as the pixels of the image data B are arranged. Each cell stores any number of the gradation values 0 to 255. The image data B and C undergo the similar subtraction operations of the gradation values on the one-pixel-from-its-counterpart basis to find the absolute values (|B-C|), which are arranged in Cell Table (2) having as many a number of cells as the pixels of the image data B. Then, a set of common entities between the cell tables 12(2) and 12(1) are extracted (|A-E| AND |B-C|); that is, as a result of the matching of each cell in Table 12(1) to its counterpart in Table 12(2), the cell of the smaller value leaves its value in corresponding blocks of Cell Table 12(3). The resultant set of common entities in the Cell Tables 12(1) and 12(2) are represented, as in the Cell Table 12(3), as cell entities of a large difference of the gradation values, of a small difference of the gradation values, and of zero difference of the gradation values. A decision of "large or small" is made depending upon if the cell entities are larger, or smaller than the threshold value as mentioned later. Parts of the inspection area B corresponding to the cells in Table 12(3) of which entities are regarded as of a larger gradation difference than the threshold value are defective, and two defects are shown in the Cell Table 12(3). In principle, the entities of the cells corresponding to normal portions on the inspection area B should have been of zero gradation difference except for a minor gradation difference due to noise component adversely detected during the scanning. In, the aforementioned explanation, the absolute values of the differences between the pixels of one image data and their respective counterparts of the other are extracted to discriminatively point out the differences between two of the image data, but instead, the absolute values may be replaced simply with the differences subjected as the suspected parts to the discriminative detection on both the image data.

Figure 6:
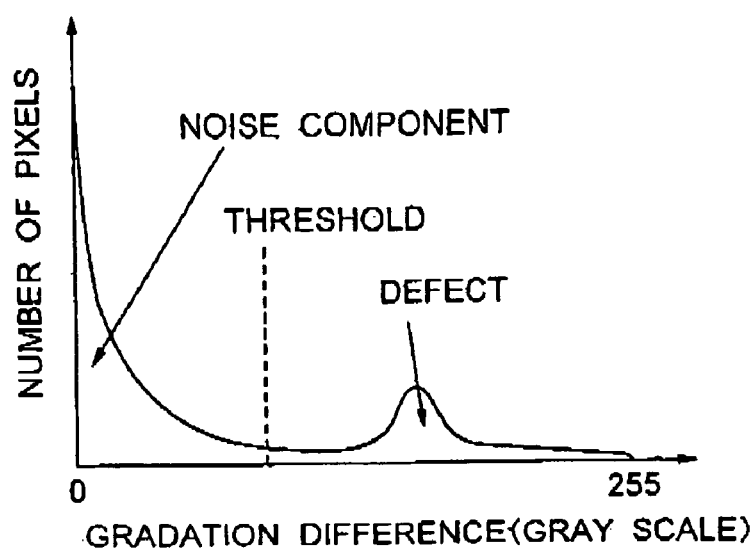
FIG. 6 is a graph representing a varied gradation on the abscissa axis and the number of pixels or the varied gradation on the ordinate axis.

The above statement is further illustrated in a graph of FIG. 6.

The graph of FIG. 6 provides the gradation difference attributed to the cells in the Cell Table 12(3) on the abscissa axis and the number of cells having the gradation difference, namely, the number of pixels of the image data B on the ordinate axis, respectively.

As can be seen in FIG. 6, any portion on the inspection area B corresponding to the pixel of a larger gradation difference than the threshold value is determined as defective. Alternatively, this criterion of discrimination of "defective" from "normal" may be replaced with some other reference. For instance, other information such as the number of the pixels of the gradation difference larger than the threshold value, coordinates of the pixels of the gradation difference, and the like may be used to count the number of defects. Specifically, an existence of more than a certain number of the pixels of a predetermined gradation difference in a certain coordinate range may prove a single defect.

On the other hand, as shown in FIG. 6, any portion on the inspection area B corresponding to the pixel having a smaller gradation difference than the threshold value is regarded as normal. In FIG. 6, gradation differences greater than zero and simultaneously larger than the threshold value are caused by noise components. Such noise components are derived from an uneven film thickness, a stage alignment precision, and the like, and the smaller gradation difference results in, the greater number of pixels being counted.

The detection of the number of defects and the existence of the defects of the inspection area B, have been described in the context of the die matching regarding three image data A to C, and it should be contemplated that an alternative to this may be a detection for only two of the image data A and B to calculate the number of defects of the inspection area B.

In the above-mentioned step of calculating the number of defects (Step S3), the die matching is used to calculate the number of defects existing in; the inspection areas 10(21) to 10(24) for each of the threshold values varied in 256 multi-levels ranging from 0 to 255.

More specifically, first, the digitized image data of the inspection areas 10(21) to 10(23) stored in the digitized image data memory 3 (6 FIG. 3) undergo the die matching in the aforementioned fashion to calculate the number of defects of the inspection area 10(22). At this time, the threshold value is incremented by one from 0 to 255, and for each of the threshold value, the number of defects is counted. In this way, the threshold value is successively varied from 0 to 255 to detect the defects in number of the inspection area 10(22) for each threshold value, and as a consequence, 256 data sets of combinations of the threshold value with the number of defects are obtained. As to the inspection regions 10(21), 10(23), and 10(24), respectively, 256 data sets in combination of the threshold value with the number of defects are similarly produced. In this embodiment, although the threshold value is varied in 256 multi-levels ranging from zero to 255, the multi-leveling of the threshold value may be corrected as desired; for example, in 128 gradations starting with zero and incremented by two as in 0, 2, 4, 6 . . . , or in only a specified range as in 51, 52 . . . , 100.

Next, as shown in FIG. 1, the step of obtaining image data (Step S1), the step of storing digitized image data (Step S2), and the step of calculating the number of detected defects (Step S3) are repeated more than once (m times), for example, five times herein. In this case, the wafer 8, which is the same one as used above, is subjected to those process steps to examine the same inspection areas 10(21) to 10(24). Another wafer may be substituted for the wafer 8, and the detection of defect is carried out for the inspection areas other than 10(21) to 10(24). Repeating the sequence of the steps in this manner, 1280 (=256×5) of the data sets of combinations of the threshold value with the number of defects are obtained for each of the inspection areas 10(21) to 10(24).

Then, referring back to FIG. 1, the step of calculating a standard deviation (Step S4) will be described.

The step of calculating a standard deviation is executed by the first arithmetic operation unit 5 (see FIG. 2) to use the combination data of the threshold value with the number of the detected defects in the previous step and calculate a standard deviation of the number of defects which are detected for each of the threshold value (0 to 255). This step will be described in more detail below.

Figure 7:
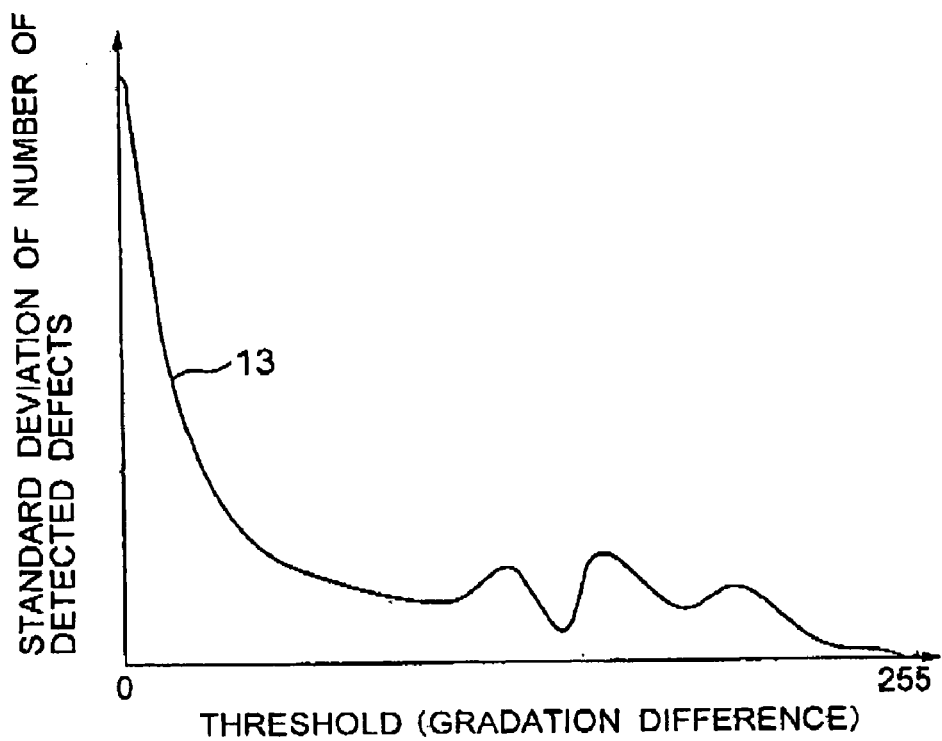
FIG. 7 is a graph representing a threshold value (varied gradation on the abscissa axis and a standard deviation of the number of detected defects on the ordinate axis.

The combination data of the threshold value with the number of detected defects, which are obtained in the previous step, are analyzed in an ordinary statistical process to obtain a standard deviation of the number of detected defects for each of the threshold values (0 to 255) A graph 13 in FIG. 7 depicts the standard deviation of the number of defects for each threshold value obtained in the above-mentioned manner.

In the graph 13, the threshold value (gradation difference) is represented on the abscissa axis while the standard deviation of the number of detected defects is on the ordinate axis.

As will be recognized in FIG. 7, as the threshold value is smaller, the standard deviation of the number of detected defects becomes greater. This is because noise inherent to the inspection apparatus, namely, noise, in this case, derived from hardware such as sensor elements and optics as represented by an alignment error occurs more often. On the contrary, as the threshold is greater, the standard deviation of the number of detected defects becomes relatively small. This is because a minor gradation difference caused by the noise of the inspection apparatus is merged into a major gradation difference derived from unevenness of film thickness and/or unevenness of wiring diameter in the target devices under inspection.

Referring back to FIG. 1 again, the step of specifying a range of the threshold value (Step S5) will now be described.

The step of specifying a range of the threshold is executed by the second arithmetic operation unit 6 to specify a range of the threshold value that eventually is to be fixed, from the relation of the threshold value (gradation difference) with the standard deviation obtained in the previous step. This step will be described in more detail below.

Figure 8:
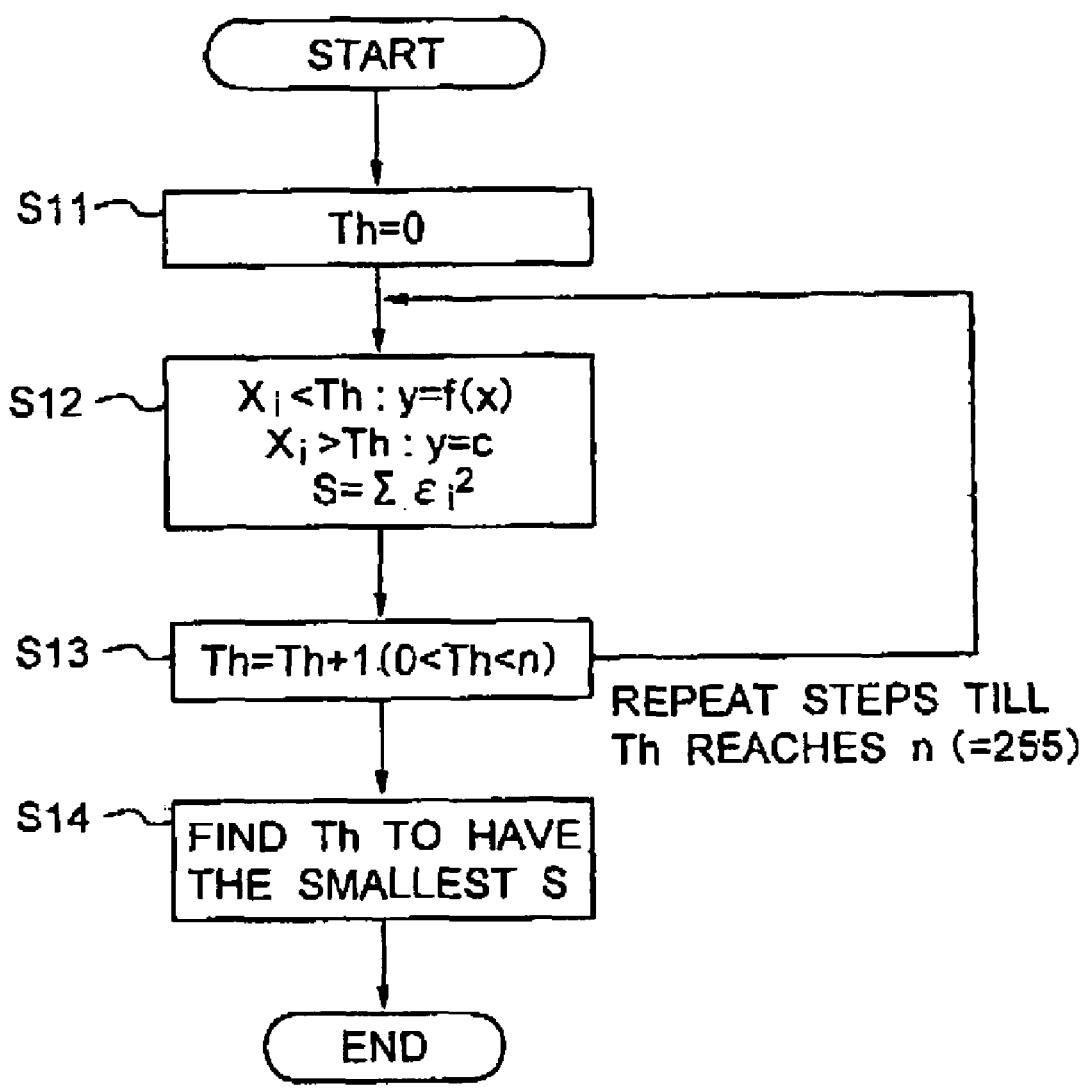
FIG. 8 is a flow chart illustrating arithmetic operations specifying a range of the desired threshold value.
Figure 9:
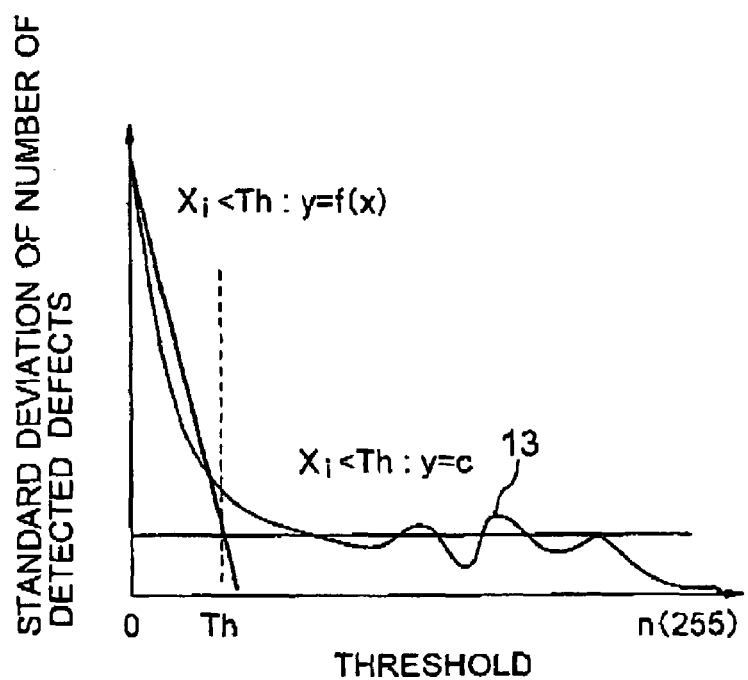
FIGS. 9 and 10 are graphs exemplifying the process steps expressed in the flow chart in FIG. 8.
Figure 10:
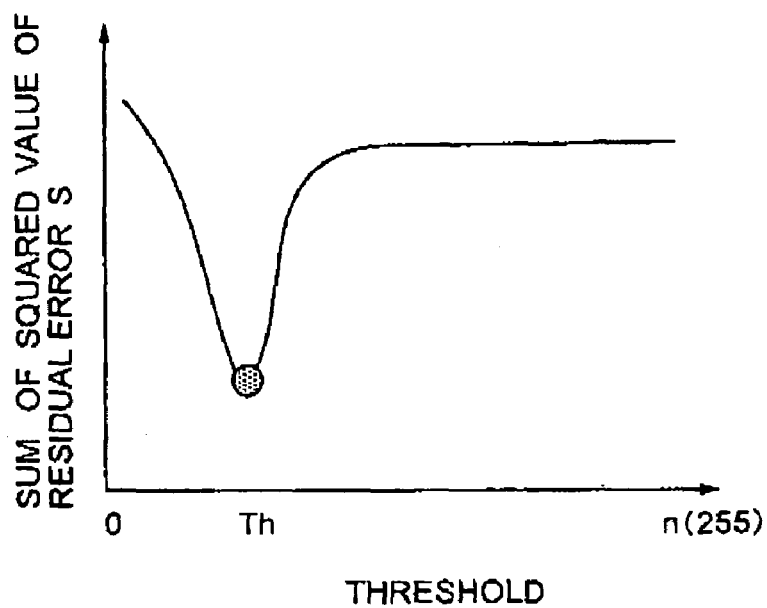

FIG. 8 is a flow chart showing mathematical processing to specify a range of the threshold value that eventually is to be fixed, and FIGS. 9 and 10 are graphs illustrating the same process as executed through the flow chart of FIG. 8. A graph 13 in FIG. 9 is similar to that of FIG. 7.

Referring to FIGS. 8 to 10, especially concentrating on FIG. 9, a computation task to specify a range of the threshold will now be described.

First, as shown in FIG. 9, a threshold Th of a certain value is selected for the curvilinear graph 13 expressing a relation of the threshold Th (=0 to 255) with the standard deviation of the number of dejected defects (Step S11). The curvilinear graph 13 approximates to a linear function y=f(x) in a range less than the threshold Th while approximating to a constant y=c in a range greater than the threshold Th. A least square method is used in the approximation, and the sum of squared values of the residual error $\epsilon_i$ to the computed approximation formula (i.e., a difference from the real data), $S=\Sigma\epsilon_i^2$ (i=0 to 255), is solved and stored (Step S12). This set of the steps from selecting a value of the threshold Th till storing the total S of squared values of the residual error are repeated for the varied threshold Th ranging from 0 to 255 (step S13). In this way obtained are data sets of combinations of the varied threshold Th from 0 to 255 with the sum S of squared values of the residual error for each of the threshold value Th. All that have been stated so far are shown as the steps from S11 to S13 in FIG. 8. Next, a relation of the varied threshold Th with the sum S for each of the threshold values is shown in a graph of FIG. 10. As can be seen in FIG. 10, from the relation of the varied threshold Th with the sum S of squared values of the residual error, a value of the threshold Th at the minimized S is computed. This computation till obtaining the threshold Th is illustrated in Step S14 of FIG. 8. The threshold value that is eventually to be fixed is computed based upon values in the range smaller than or greater than the threshold Th (see FIG. 11). In this way, the range of threshold that is eventually to be fixed can be specified (discriminative analysis). In, this embodiment, as detailed later with reference to FIG. 11, the eventual threshold is computed from a range L1 of the threshold value smaller than the threshold Th. (see FIG. 11).

Then, referring back to FIG. 1, the step of determining a threshold value (Step S6) will be described.

The step of specifying a threshold value is executed by the second arithmetic operation unit 6, (see FIG. 2) to determine the eventual threshold value in the range of the threshold value obtained in the previous step. This step will be described in more detail below.

Figure 11:
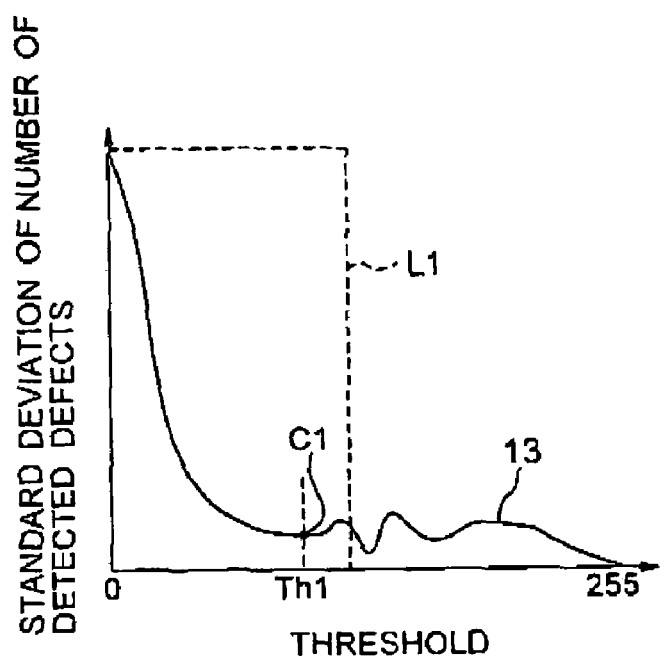
FIG. 11 depicts a situation in which the threshold value is eventually determined in the range calculated in the process step of specifying the range of the threshold value as illustrated in the flow chart.

FIG. 11 is a graph illustrating a situation where a threshold Th1 is eventually determined in the threshold range L1 specified in the previous step (step S5); The threshold Th1 will be computed in the following manner.

As can be seen in FIG. 11, the threshold value inducing the minimum standard deviation of the number of detected defects is computed in the specified threshold range L1, and this value of the threshold is employed as the eventual threshold Th1. A point of the threshold Th1 in the graph 13 is referred to as "property point C1".

Figure 12:
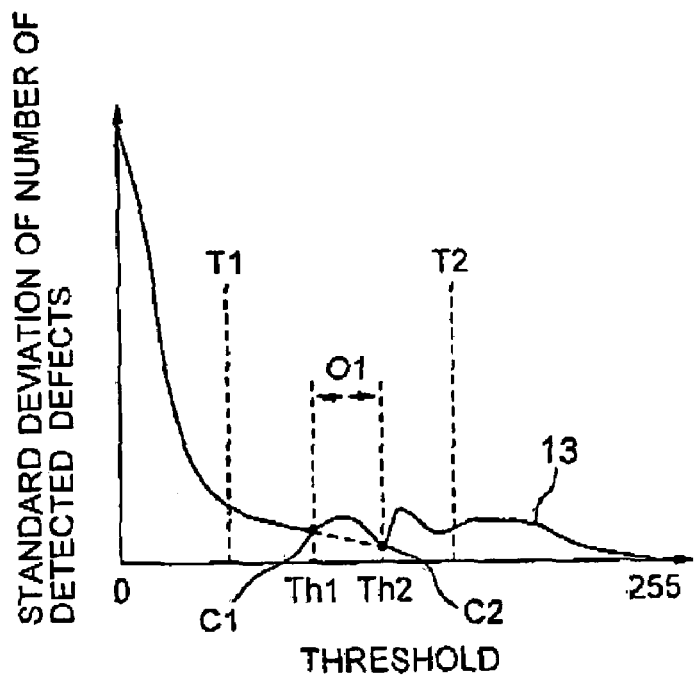
FIG. 12 is a graph showing a situation where an arbitrary offset value is given to the determined threshold value.

Additionally, allowing for lot-to-lot variations in a wafer and/or wafer-to-wafer non-uniformity in the same lot, an arbitrary offset value O1 is, as can be seen in FIG. 12, applied to the threshold Th1 as determined above to revise a threshold Th2 as the eventual value. A point of the threshold Th2 in the graph 13 is referred to as "property point C2". In this case, however, as shown in FIG. 12, the minimized threshold value T1 and the maximized threshold value T2 are determined so that the threshold Th2 can be in a permissible threshold range T1-T2, thereby successfully preventing the threshold Th1 added by the offset value O1 (i.e., the threshold Th2), from departing from the range.

Figure 13:
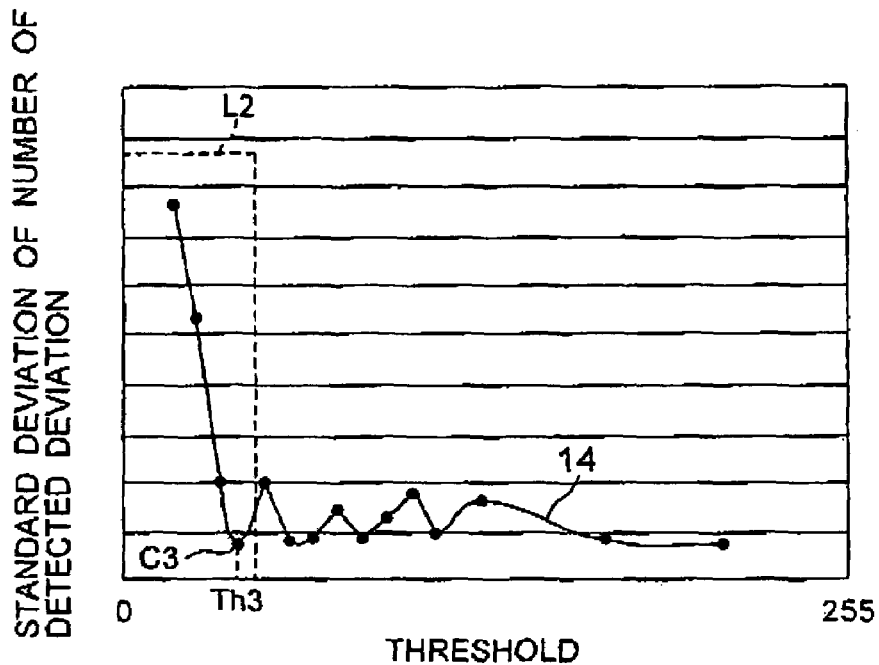
FIG. 13 is a graph showing a situation where the threshold value is obtained through Step S6 in the flow chart.

FIG. 13 shows the computation results of the final threshold value Th3 that are obtained by applying the aforementioned sequence of the steps S1 to S5 (the Steps S1 to S3 are repeated five times; see FIG. 1) to simulation defect test element group (TEG) wafers where the number and coordinates of defects preliminary made in the wafers are known. The matching the simulation defect TEG wafers undergo on the inspection apparatus is found to attain a time reduced matching job and an enhanced reliability. In this embodiment, the threshold Th3 is computed without using the offset value as mentioned above (see FIG. 12). With the threshold Th3, a defect detection rate is 98%, and an error detection rate is 1%. The similar experiment to actually marketed wafers instead of the simulation defect TEG wafers proves that an acceptable threshold can be obtained, showing the same degree of detectivities for defects and errors, respectively.

Figure 14:
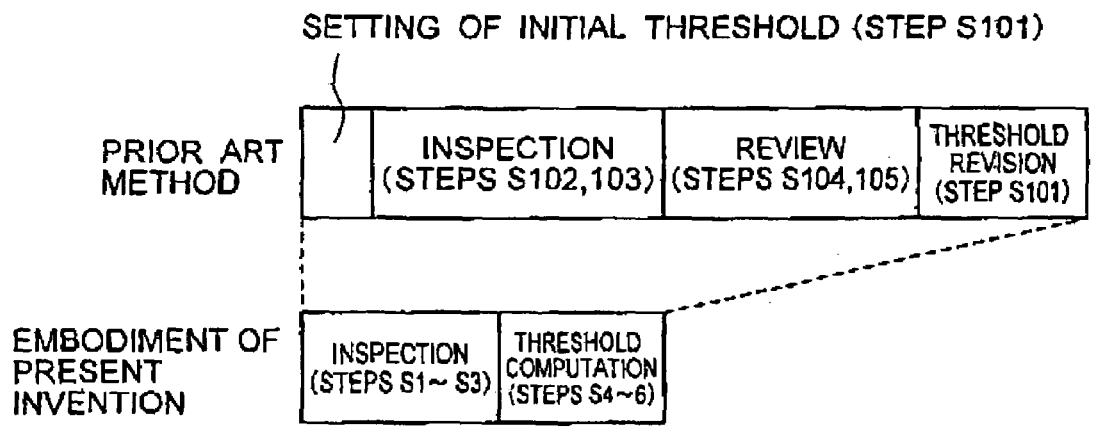
FIG. 14 is a graph provided for illustrating effects of a first embodiment of the present invention.

As has been recognized, since this embodiment enables the determination of the threshold by a quantifying manner employing a statistical method, the process step of reviewing in the prior art can be omitted, as shown in FIG. 14, which brings about a reduction of time required to determine the threshold. Also, the threshold can be computed reliably, regardless of the skills of the recipe planner.

Figure 15:
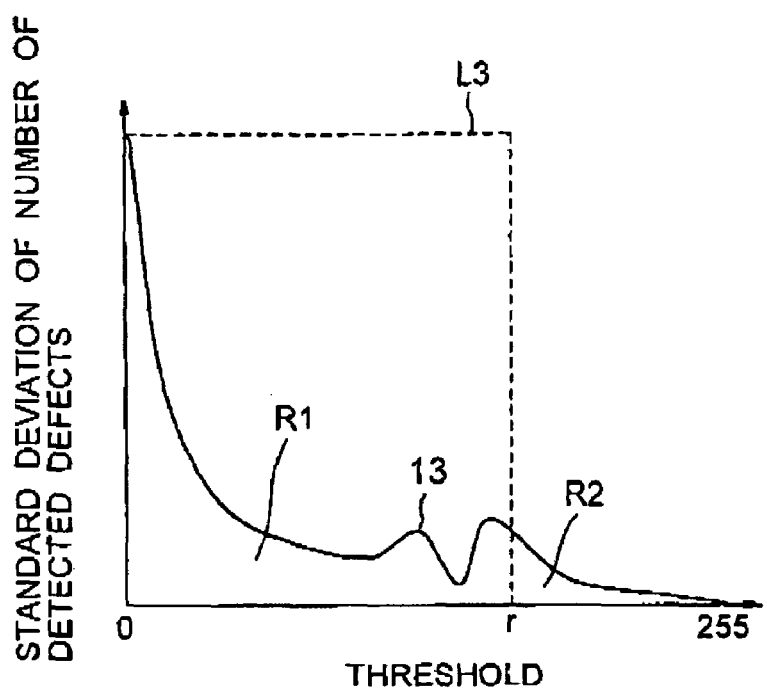
FIGS. 15, 16 and 17 are graphs showing a method employing a replacement manner of specifying the range of the threshold value in the threshold value specifying step in the flow chart in FIG. 8.

The specification of the threshold range at the step S5 (see FIGS. 8 to 10) may be replaced with other method as in FIG. 15, In this case, for example, the threshold values are divided into ranges greater than r and smaller than the same, and the standard deviation of the number of detected defects is integrated for each of the threshold ranges to compute integral values R1 and R2. The range of the threshold is sectioned at the threshold value r at a given rate of the integral value R1 to R2 (i.e., R1/R2); for example, a range L3 defined by the threshold value r may be specified as the threshold range.

Figure 16:
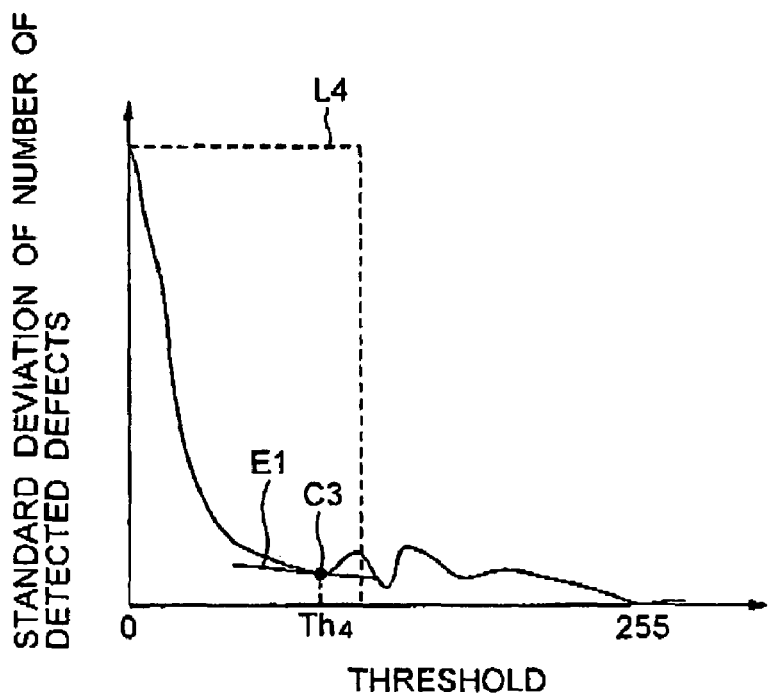

The specification of the threshold value at Step S6 (see FIGS. 11 and 12) may be replaced with other method as in FIG. 16. For instance, an arbitrary means is selected from the aforementioned methods to define a threshold range L4, and then computed is a property point C3 at which the standard deviation of the number of detected defects integrated by the threshold value (a tilt of straight line E1) takes a predetermined value within the range L4, thereby determining a threshold Th4 corresponding to the property point C3 as an eventual threshold.

Figure 17:
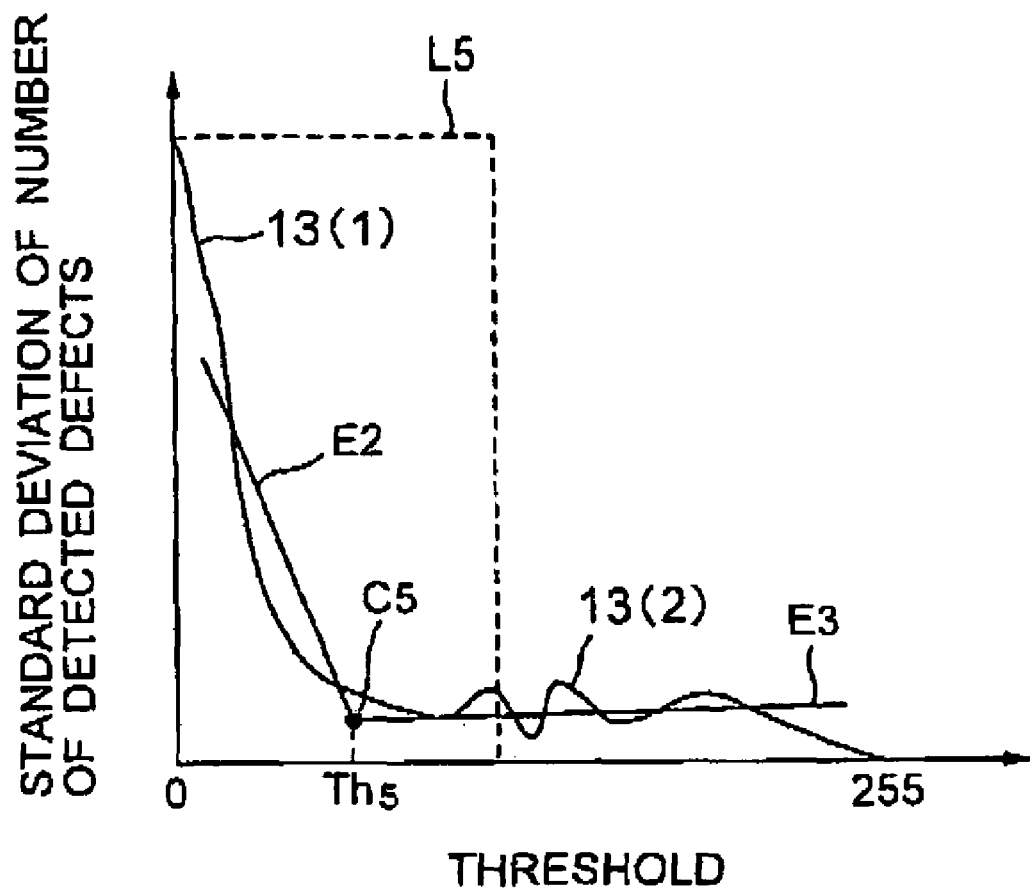

The specification of the threshold may be performed by a substitution method as in FIG. 17. For instance, an arbitrary means among the aforementioned methods is; used to find a threshold range L5, and then, approximating the graph 13(1) within the range L5 to two linear functions E2 and E3 to find an intersection (property point) C5 between the linear functions E2 and E3, a threshold Th5 corresponding to the property point C5 can be selected as an eventual threshold value.

EMBODIMENT 2

Another embodiment is devised to keep more than one inspection apparatuses matched to appropriate sensitivity by applying the aforementioned first embodiment. This embodiment will be detailed below.

Figure 18:
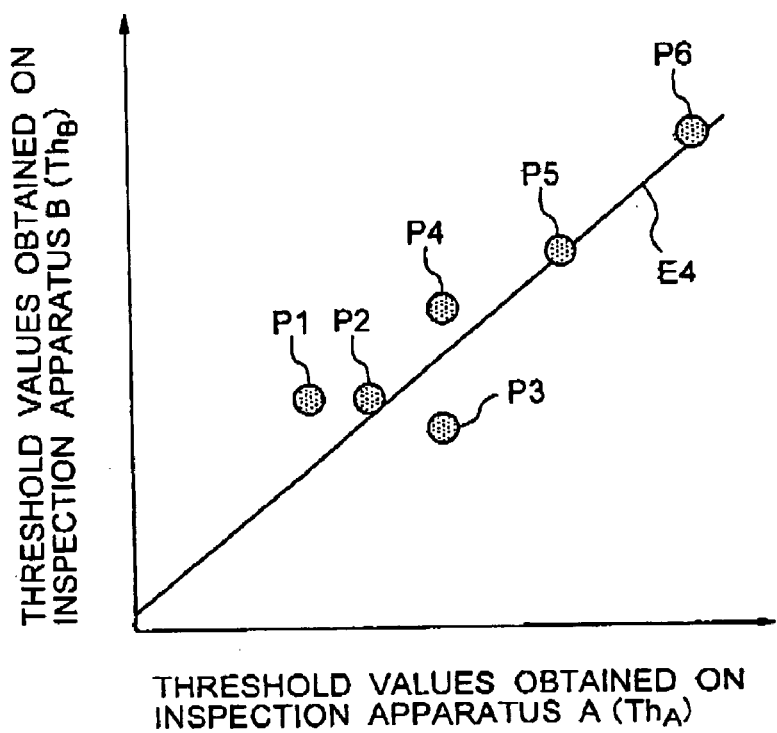
FIG. 18 is a graph illustrating the matching of more than one inspection apparatuses, following the first embodiment of the present invention.

With an application of the first embodiment, the same sample semiconductor devices are scanned on inspection apparatuses A and B to compute threshold values ThA and ThB. To obtain additional sets of the threshold values ThA and ThB, additional sample semiconductor devices different from those used in the previous procedure, for example, five of them are used. The five semiconductor devices are different from one another. FIG. 18 shows the results of plotting in coordinate system six sets of the threshold value's ThA and ThB obtained respectively for six of the sample semiconductor devices on the inspection apparatuses A and B.

As can be seen in FIG. 18, data of the threshold values ThA and ThB in the plotted points P1 to P6 are processed in a linear approximation method to produce approximation line (calibration line) E4 to the threshold values ThA and ThB. A tilt of the calibration line E4 is 1. Although, ideally, the points P1 to P6 are plotted in the calibration line E4, some plotted points lie in locations slightly apart from the calibration line E4 due to peculiarities inherent to the inspection apparatuses A and B. As will be perceived from the locations of the plotted points P1 to P6, however, it seems that a correlation coefficient R (e.g., 0<R<1) indicating a depth of correlation of the threshold values ThA and ThB reaches a certain level or, even higher. The ideal correlation coefficient R is 1, Thus, a permissible range of the correlation coefficient R is determined, allowing for the peculiarities inherent to the apparatuses, and if the correlation coefficient R is not in the range, the inspection apparatuses must be sent for maintenance. When the correlation coefficient R is appropriate but the tilt of the calibration line E4 is deviated from 1, also, the inspection apparatus should probably be sent for maintenance.

As has been described, in this embodiment, the inspection apparatuses can keep matched with appropriate sensitivity, relying on the threshold computed quantitatively. Hence, a time required for the matching is reduced, and a beneficial reliability of the matching results is also attained.

EMBODIMENT 3

Another embodiment applies the aforementioned first embodiment in performing a quality control (QC) of the inspection apparatuses to check if the inspection apparatuses are well maintained as required. More specifically, the results of the inspection previously carried out more than once are compared with the results of the current inspection to confirm if the inspection apparatuses previously and currently used are well maintained as required at present. This embodiment will be detailed below.

Figure 19:
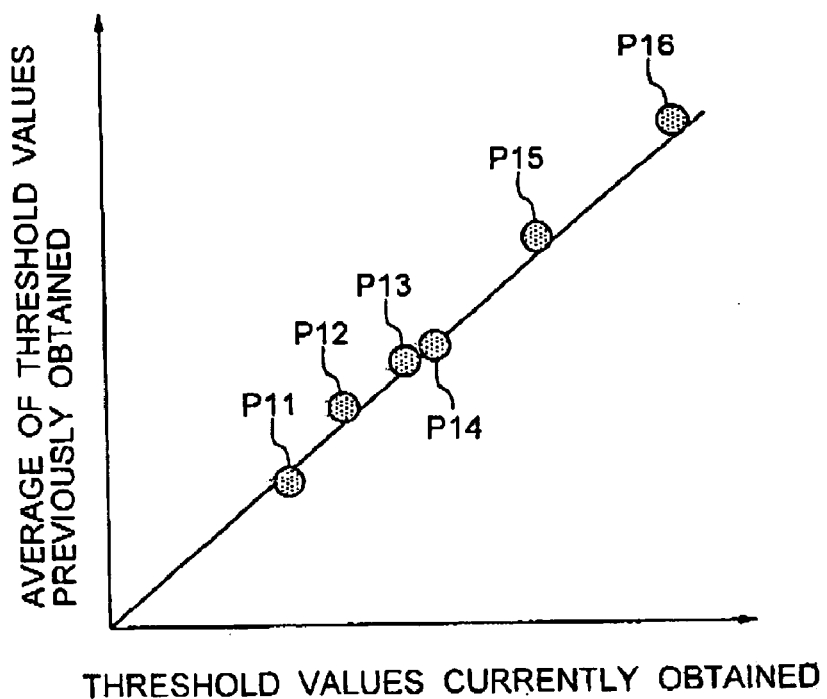
FIG. 19 is a graph illustrating a quality control (QC) for the inspection apparatuses, following the first embodiment of the present invention.

This time, the first embodiment is applied to the inspection on some inspection apparatuses to obtain threshold values of six sample semiconductor devices. In contrast, the threshold values already computed during more than one inspections of the same six sample semiconductor devices on the same inspection apparatuses are averaged to find a mean value of each of the sample semiconductor devices. For example, when the computation of the threshold has already been carried out n times before the current inspection, n threshold values obtained for the six sample semiconductor devices are averaged In this way, combination data of the previously obtained average of the threshold values with the threshold values obtained this time are produced for each of the six sample semiconductor devices. FIG. 19 illustrates points P11 to P16 that are six combination data plotted in the coordinate system with the abscissa axis representing the threshold value obtained this time and the ordinate axis representing the average of the previously obtained threshold values.

As can be seen in FIG. 19, a linear approximation method is used to produce approximation line E5 to the plotted points P11 to P16. A tilt of the calibration line E5 must be approximately 1, and a correlation coefficient R must also be approximately as high as 1. Thus, once the permissible range of tilt of the approximation line E5 or of the correlation coefficient R is determined, the inspection apparatuses having the tilt or the correlation coefficient R deviated from the range are regarded as not maintained well and having to be sent for maintenance.

As has been recognized, this embodiment enables the quality control of the inspection apparatus relying upon the threshold values quantitatively computed, and this also enables more precise management with improved sensitivity to a degradation of performance of the inspection apparatuses.

EMBODIMENT 4

Another embodiment applies the aforementioned first and third embodiments to a quality control of the inspection apparatuses so as to optimize the total cost performance of the inspection apparatuses.

First, a concept of the optimization of total cost estimation will now be described.

Figure 20:
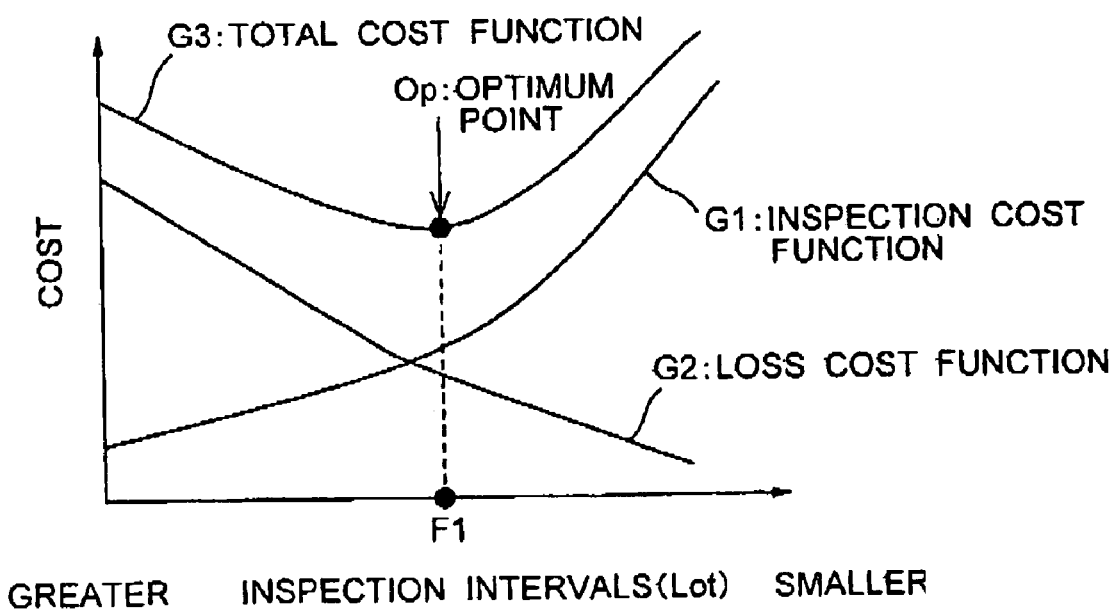
FIG. 20 is a graph (of loss function) illustrating an exemplary model frame of the total cost optimization.

FIG. 20 is a graph (of loss function) illustrating a model frame of optimizing the total estimated cost. Intervals from one wafer inspection to the next are represented on the abscissa axis while estimated cost (loss) is on the ordinate axis.

As can be seen in the graph G1 of inspection cost performance in FIG. 20, as the inspection intervals become longer, or as a frequency of the wafer inspection is decreased, the estimated cost required for the wafer inspection is reduced. Also, as will be recognized in a loss cost graph G2, as the intervals between wafer inspections become longer, the estimated cost of loss is increased due to defective products that are overlooked skipping an inspection. The total cost is a sum of the inspection cost and the loss cost, which is depicted as a graph G3 gained by adding the inspection cost graph G1 and the lost cost graph G2 as in FIG. 20. Thus, the wafer inspection interval that minimizes the loss; as a whole is recognized in the total cost graph G3 as a point F1 at which the total cost is correspondingly minimized at the optimized point Op in the graph G3. In this way, the wafer inspection intervals minimizing or optimizing the total cost can be found. Although the inspection interval is considered as one of cost factors influencing the total cost, the remaining cost factors include a type of the inspection apparatuses, the number of inspected wafers, an inspected surface coverage, a frequency of reviewing defects, a manner of reviewing defects, and so forth. In this embodiment, the cost factors are computed in a quantifying manner to optimize the total cost, so that the wafer inspection can be carried out on the basis oriented to the optimized cost performance.

Figure 21:
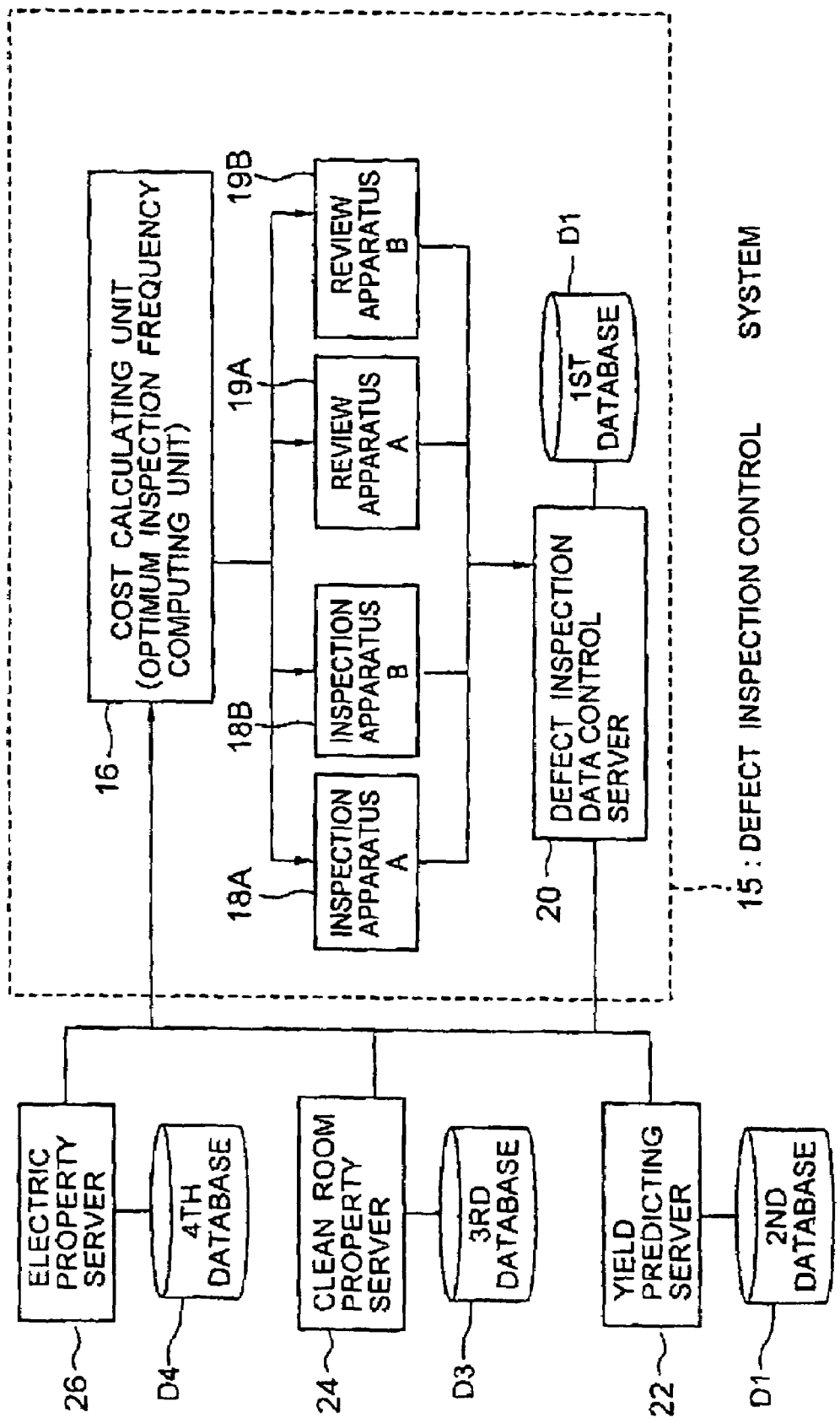
FIG. 21 depicts a cost control system calculating various data on factors of the cost estimation for the total cost optimization.

FIG. 21 is a diagram showing an architecture of the cost control system that permits a computation of various cost factors to optimize the total cost and then performs inspections relying on the computed cost factors.

The cost control system includes a defect inspection management system 15 that produces data of the cost factors (e.g., the inspection intervals., the number of inspected wafers, etc.) useful to optimize the total cost based on information about predictable yields, processing apparatuses, product schemes, and so forth, so as to perform the wafer inspection relying on the cost factor data. Also, the cost control system includes a yield predicting server 22 capable of gathering feedback data on defects detected through the wafer inspection by the defect inspection control system 15 to correct information on predicted yields and processing apparatuses used to produce the cost factor data, and further includes a clean room (CR) property server 24. Additionally, the cost control system has a electric property server 26 that uses data resulted from a electric property check of wafer by a tester on the inspection apparatuses (not shown) to confirm validity of the data on defects. The cost control system will be described in more detail below.

As shown in FIG. 21, the defect inspection control system 15 serving as a major portion of the cost control system includes a cost calculating unit 16 that uses predetermined operation formulae to compute data on the inspection intervals, the inspection apparatuses, the number of inspected wafers, the inspected surface coverage, the frequency of reviewing defects, the manner of reviewing defects, and so on.

Also, the defect inspection control system 15 includes inspection apparatuses 18A and 18B that executes the defect inspection of wafers, relying upon the cost factor data such as the inspection intervals computed by the cost calculating unit 16. Data on the threshold values for the inspection apparatuses 18A and 18B, and data on the inspection such as inspection mode data representing a resolution during the image pickup operation are set and saved in the inspection apparatuses 18A and 18B in advance.

Moreover, the defect inspection control system includes review apparatuses 19A and 19B that uses data on defects detected on the inspection apparatuses 18A and 18B (e.g., the number of defects, dimensions of the defects, types of the defects, coordinates of the defects) to review and classify defects of the wafers.

The defect inspection control system 15 further includes a defect inspection data management server 20 for management of the cost factor data such as the inspection intervals produced by the cost calculating unit 16, the inspection data predetermined in the inspection apparatuses 18A and 18B, and the data of defects from the inspection apparatuses 18A and 18B. The defect inspection control system 15 also includes a first database D1 that stores the cost factor data, the inspection data, and the defect data.

The cost control system, which is provided with the defect inspection control system 15 configured as mentioned above, further includes a yield predicting server 22 that uses data such as the defect data stored in the first database D1 to predict yields, and a second database D2 that stores data on the predicted yields computed by the yield predicting server 22.

The cost control system includes a CR propertyserver 24 for management of various processing apparatus related data used for the wafer processing steps (names of the apparatuses, the number of them, manners of the processing, throughputs, prices of the apparatuses, terms of depreciations, payrolls, maintenance fees, expenses for powers, availability rates, etc.) and of product scheme data (expected yields, the number of introduced lots, terms of setting work, expenses for the work, the number of process steps, etc.). The cost management system includes a third database D3 that is administered by the CR property server 24 and stores the above-mentioned various processing apparatus related data and the product scheme data.

The cost control system includes an electric property server 26 that gathers data on the results of inspections by the tester (real yield check) on tester inspection apparatuses (not shown) that assuredly detect electrical malfunction of wafers. The electric property server 26 is designed to receive the data on the inspection results and retrieve data on the portion of wafer having electrical malfunction to compute coordinate data on the defective portion. The electric property server 26 is also designed to receive the defect data (including data on coordinates of defective portions) from the inspection apparatuses 18A and 18B and match the defect data with the computed coordinate data to check validity of the defect data from the inspection apparatuses 18A and 18B. The electric property server 26 is adapted to store data of the matching results in the fourth database D4 connected thereto.

An operation of the cost control system as mentioned above will be described, focusing on an operation of its major portion or the defect inspection management system 15.

Figure 22:
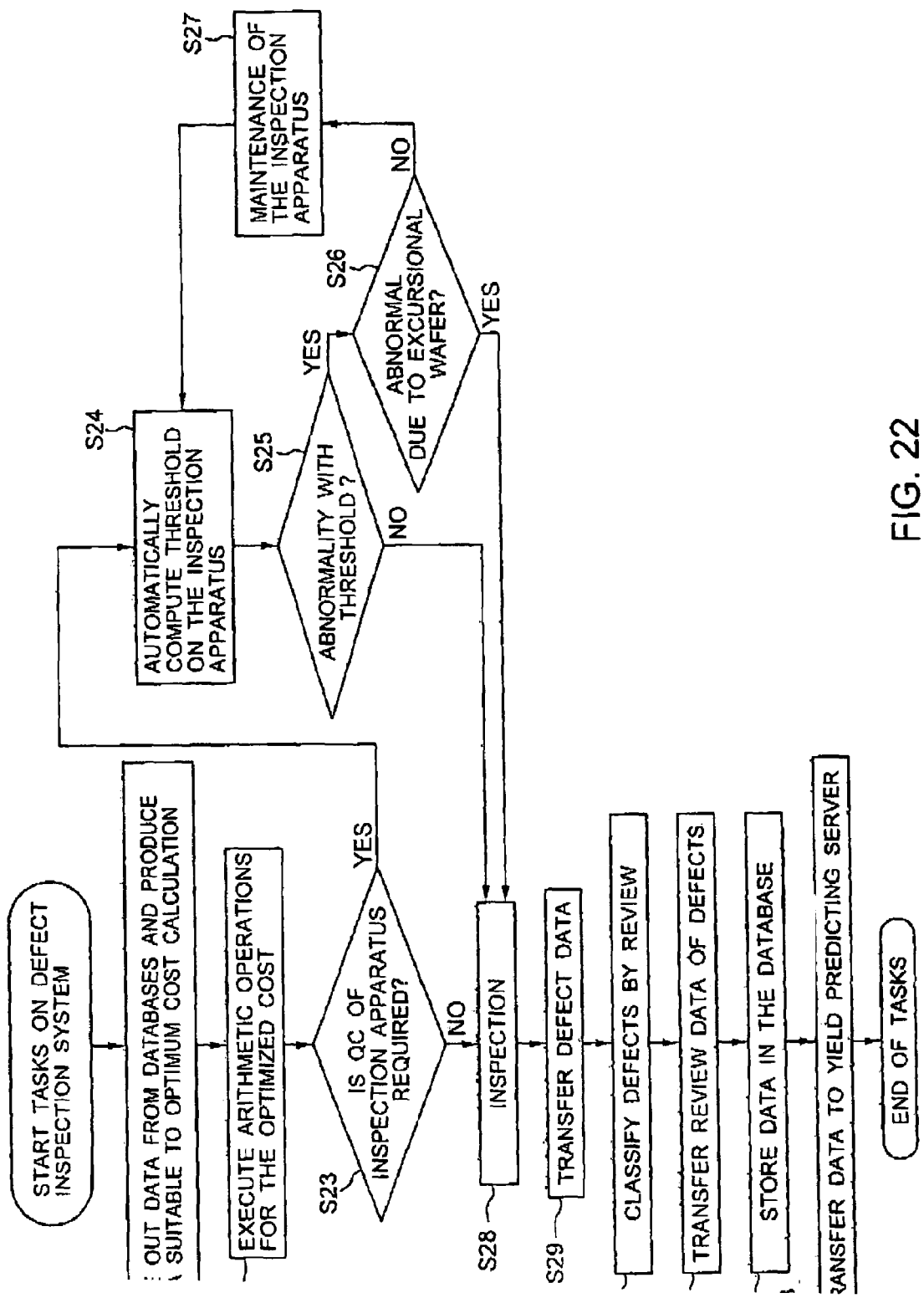
FIG. 22 is a flow chart illustrating an operation of a defect inspection management system of the cost control system.

FIG. 22 is a flow chart illustrating the operation of the defect inspection control system incorporated in the cost control system.

The cost calculating unit 16 gathers required data from the first to fourth database D1 to D4 in computing the optimum cost to produce the cost factor data for the optimization of the total cost. The cost calculating unit 16 produces data used to set various parameters of arithmetic operation formulae for the optimized, cost, based upon the data taken out from the first to; fourth database D1 to D4 (Step S21).

Then, the cost calculating unit 16 substitutes the various data produced for the parameters of some of the arithmetic operation formulae and then executes arithmetic operations for the optimized cost to produce the cost factor data such as the inspection interval data suitable for the optimization of the total cost (step S22).

More specifically, the cost calculating unit 16, after substituting the data for the various parameters in the formulae, finds an inspection cost function with a variable of the inspection interval data (see the graph G1 in FIG. 20) and a loss cost function with a variable of the inspection interval data (see the graph G2 in FIG. 20) through arithmetic operations. Then, a total cost function that is the sum of the inspection cost function and the loss cost function (see the graph G3 in FIG. 20) is produced. Similarly, the total cost function is computed for the remaining cost factor data such as the number of inspected wafers, and the obtained total cost functions are comprehensively evaluated to find the most cost effective value (Step S22).

Figure 23:
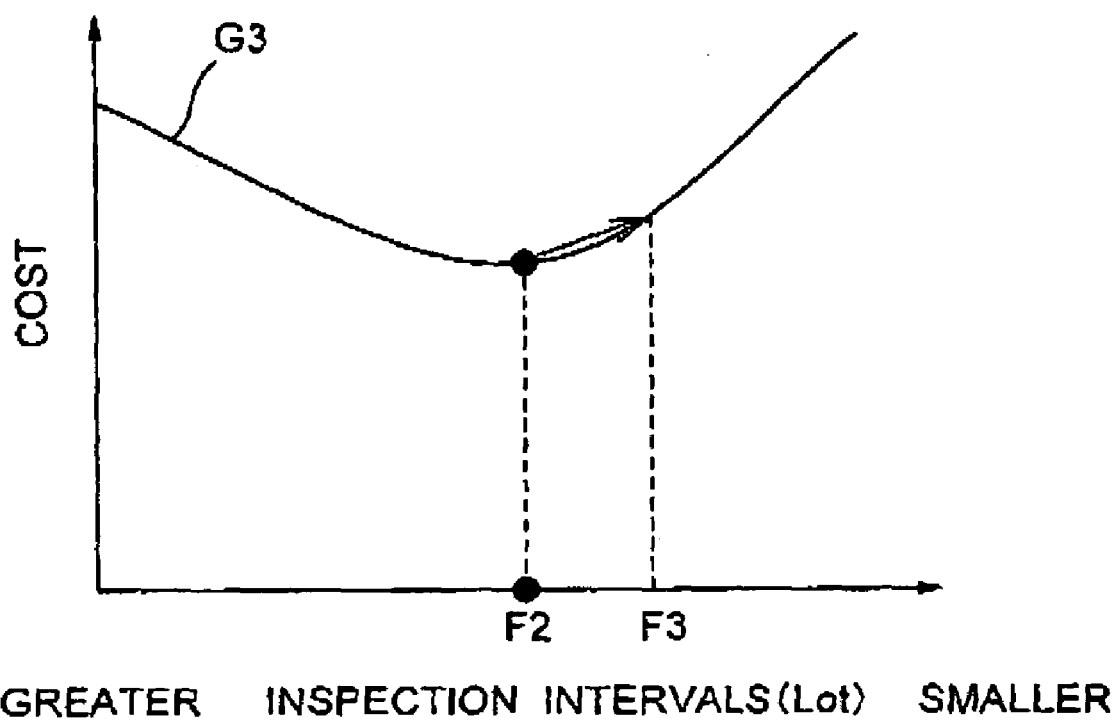
FIG. 23 is a graph illustrating a situation of correcting the data on factors of the cost estimation, sacrificing the total cost performance.
Figure 24:
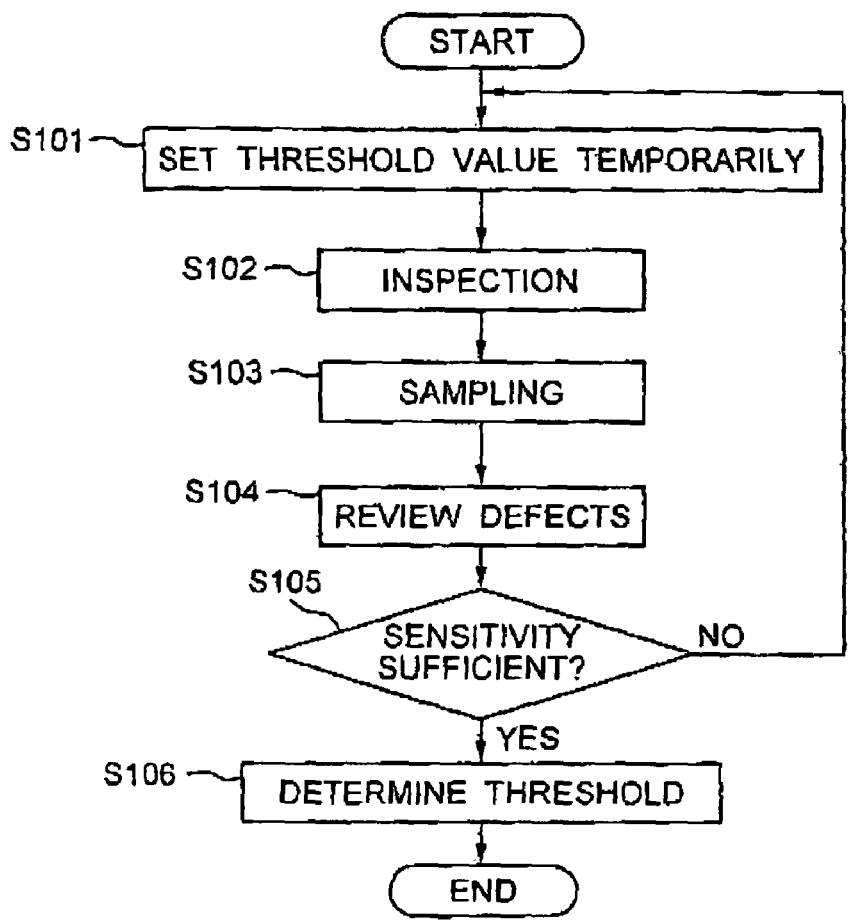
FIG. 24 is a flow chart illustrating a prior art method of setting a threshold value (inspection sensitivity)
Figure 25:
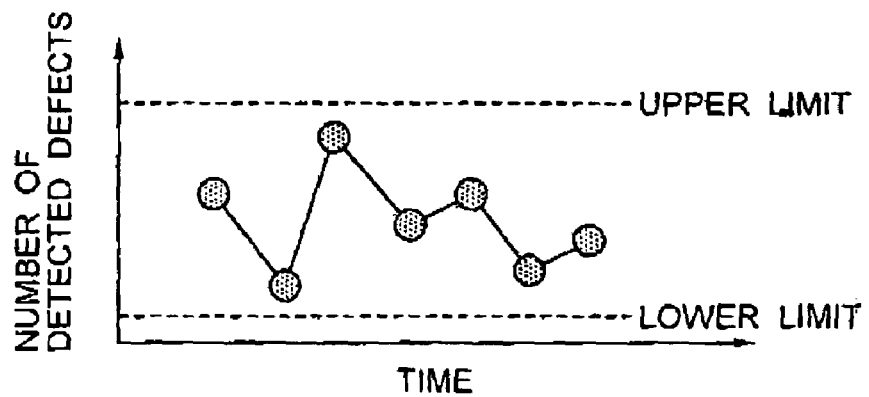
FIG. 25 is a graph illustrating an example of a prior art quality control of the inspection apparatuses.

At Step S22, the cost factor data suitable to minimization of the total cost is computed, but the total cost may be neglected as required, for example, by shortening the inspection interval as shown in FIG. 23. Specifically, when the inspection apparatuses have an excessive capacity available, the inspection interval may be shortened to carry out the inspection more frequently on them. Also, when it is necessary to inspect a numerous wafers to compute the predicted yields mentioned later, the total cost may be sacrificed to shorten the inspection interval.

After the cost factor data are computed, the inspection apparatuses 18A and 18B make a decision if they should undergo the QC (see the third embodiment and FIG. 19) (Step S23). The inspection apparatuses 18A and 18B store, in advance, data on a registered cycle (e.g., a week) at which the inspection apparatus QC is carried out, and the inspection apparatuses 18A and 18B determine if time elapses over the cycle period of the data after the previous inspection apparatus QC.

If the inspection apparatuses 18A and 18B determine to execute the QC (YES at Step S23), they compute the threshold values, following the manner as in the first embodiment (Step S24).

With the application of the third embodiment, the inspection apparatuses 18A and 18B determine if the computed threshold values are in the predetermined range (Step S25). If so (YES at Step S25), it is checked if the wafer with which the threshold values are computed is normal (Step S26).

No excursional wafer is found (NO at Step S26), it is judged that there is something abnormal with the inspection apparatuses 18A and 18B and they should be sent for maintenance (Step S27). Then, the threshold values are computed on the inspection apparatuses 18A and 18B again (Step S24), and it is determined if the computed threshold values are in the predetermined range (Step S25).

On the other hand, if the inspection apparatuses 18A and 18B determine not to undergo the QC (NO at Step S23), and if no abnormality is found with the inspection apparatuses 18A and 18B (NO at Step S25), Step S28 is executed after additional judgment that there is something wrong with the wafer (YES at Step S26). The inspection apparatuses 18A and 18B receives the cost factor data such as the inspection interval data obtained through the arithmetic operations to obtain the optimized cost at Step 22, and then proceeds with the inspection to find defects of the wafer based upon the received cost factor data (Step S28).

The inspection apparatuses 18A and 18B, after the defect check of the wafer, send data on defects detected through the inspection (coordinates of the defects, the number of defects, types of the defects, dimensions of the defects, etc.) to the defect inspection data management server 20, which stores the received defect data in the first database D1 (Step S29).

Also, the inspection apparatuses 18A and 18B transfer part of the data of the detected defects, namely, the data on the coordinates of the defects, for example, to the defect review apparatuses 19A and 19B (Step S29).

The review apparatuses 19A and 19B, receiving the data like the coordinates of the defects from the inspection apparatuses 18A and 18B, further receive the data computed through the optimization cost calculation at Step S22, namely, the data on the manner of reviewing the defects and the number of times of the reviewing, from the cost calculation unit 16 to classify the defects, following instructions of the received data (Step S30). When the received data on the manner of reviewing defects is an ADC data, the throughput on the number of times of the reviewing is increased, but instead, a precision of the defect classification by means of the review is degraded. In contrast, the received data on the manner of reviewing defects is a manual classification data, the precision of the defect classification by the review is upgraded, but instead, the throughput of the frequency of the reviewing is decreased.

After completing the defect classification, the review apparatuses 19A and 19B transmit the defect review data to the defect inspection data management server 20 (Step S31).

The defect inspection data management server 20 stores the received defect review data in the first database D1 (Step S32).

The defect inspection data management, server 20, once storing the defect data and the defect review data as stated above in the first database D1, transmits a feedback data of the same data stored in the first database D1 to the yield predicting server 22 (Step S33).

The defect inspection control system 15 finishes its tasks in the aforementioned manner, and succeedingly, the remaining apparatuses execute other jobs of processing.

The yield predicting server 22, receiving the defect data and the defect review data from the defect inspection data management server 20, uses the received data to renovate various data in the second database D2 connected thereto, so as to produce renewed yield predicting data. The existing yield predicting data is overwritten by the new yield prediction data.

The yield predicting server 22, once renovating the yield predicting data, may correct the renewed yield predicting data with reference to the data on real yields stored in the fourth database connected to the electric property server 26. The yield predicting server 22 may correct other data such as killer prediction rates for classes of the defects stored in the second database D2.

The yield predicting server 22, after renovating the yield predicting data or correcting the renewed yield predicting data, transfers the renovated or corrected yield predicting data to the CR property server 24. The CR property server 24 uses the received yield predicting data to correct the information about the product schemes in the third database D3 connected thereto. The electric property server 26 receives the defect data (including the coordinate data on, the defects) from the inspection apparatuses 18A and 18B and matches the defect data with the coordinate data computed from the results of the above-mentioned tester inspection to check validity of the defect data, and the results of validity confirmation are stored in the fourth database D4. After that, the tasks are repeated, following the flow chart in FIG. 22.

As has been described, in this embodiment, the cost factor data such as the inspection intervals that should be input in the inspection apparatuses can be quantitatively determined, allowing for the total cost. In addition to that, in newly constructing process lines of semiconductor devices at manufacturing plant, various database incorporated in the aforementioned cost management system can be exploited to compute an appropriate number of the inspection apparatuses required to the newly established process line, which bring about an optimization of the cost invested in the construction of the new process line.

In accordance with the present invention, image data taken from the desired surface areas of each of semiconductor devices are analyzed by a statistical method to produce mathematical functions, and data on defect detection sensitivity are obtained from the functions, thereby determining the defect detection sensitivity data in a quantifying manner.

What is claimed is:

1. A method of determining defect detection sensitivity data, comprising:

taking image data from the desired surface areas of each of semiconductor devices, processing at least two of the image data through arithmetic operations and comparing the processed image data with a parameter of defect detection sensitivity substituted by predetermined threshold data to obtain information on defects in the desired areas at least in one-to-one correspondence with any of the image data arithmetically processed, repeating more than once the step of varying the parameter of the defect detection sensitivity to obtain the defect information, so as to obtain more than one sets of combination data on a value of the parameter of the defect detection sensitivity correlated with the defect information, processing more than one sets of the combination data to produce a mathematical function expressing a relation of the desired statistical data with the parameter of the defect detection sensitivity, the mathematical function being used to determine defect detection sensitivity data, the defect detection sensitivity data being used in obtaining the information on the defects in the desired surface areas of the semiconductor devices under defect inspection, and the defect detection sensitivity data defining an existence range of the defect information in the image data which are taken from the desired surface areas of each semiconductor device and which are arithmetically processed in the previous step.

2. A method according to claim 1, wherein the taking image data from the desired surface areas of each of semiconductor devices includes directing light or electron beam to the desired surface areas and receiving reflected light or electrons from the desired surface areas to pick up the image data.

3. A method according to claim 1, wherein in prior to the taking image data from the desired surface areas of each of semiconductor devices, the semiconductor devices have artificial defects provided in advance, and any or all of types, sizes, the number, coordinates are initially known.

4. A method according to claim 1, wherein the image data are picked up in digitized image data format.

5. A method according to claim 4, wherein the arithmetic operations are executed for pixels of the digitized image data on the single-pixel-at-a-time basis.

6. A method according to claim 5, wherein the arithmetic operations are directed to find a difference of gradation values between one pixel and another.

7. A method according to claim 1, wherein the obtaining information on defects in the desired areas includes getting data on the number of the defects.

8. A method according to claim 1, wherein the desired statistical data is data on a standard deviation of the number of the defects in the desired areas.

9. A method according to claim 8, wherein the data on a standard deviation are expressed as a function of the parameter of the defect detection sensitivity, and the defect detection sensitivity data is fixed as a value of its parameter when a linear differentiation of the standard deviation data leads to a predetermined differential value.

10. A method according to claim 9, wherein the predetermined differential value is zero.

11. A method according to claim 1, wherein the function is approximated to two or more additional functions to find an intersection of the two or more functions serving as a partitioning point, and a range within which the defect detection sensitivity data is to be determined is specified based upon the value of the parameter of the defect detection sensitivity corresponding to the partitioning point, thereby eventually determining the defect detection sensitivity data within the specified range.

12. A method according to claim 1, wherein the function is partitioned in arbitrary sections within the range of the parameter of the defect detection sensitivity, the function is integrated by the parameter of the defect detection sensitivity in each of the sections, an integral value corresponding to each of the sections is used to specify either of the sections within which the defect detection sensitivity data is to be determined, thereby determining the defect detection sensitivity data within the specified range.

13. A method of determining defect detection sensitivity data, including determining the defect detection sensitivity data in accordance with the method of claim 1, and adding an arbitrary offset value to the defect detection sensitivity data determined in the previous step, so that the defect detection sensitivity data is eventually fixed at the sum as a result of the addition.

14. A method of controlling defect detection apparatuses, the method exploiting first defect detection sensitivity data determined in accordance with the method of claim 1 during a first period of time, and second defect detection sensitivity data determined in accordance with the method of determining the first detection sensitivity during a second period of time prior to the first period of time, thereby performing a maintenance of semiconductor device defect inspection apparatuses over time.

15. A method of controlling defect detection apparatuses according to claim 14, wherein the first and second defect detection sensitivity data are exploited to compute a correlation coefficient of the first and second defect detection sensitivity data, and it is determined if the computed correlation coefficient is within a predetermined range, a maintenance of semiconductor device defect inspection apparatuses over time being performed, depending upon the determination.

16. A method of controlling defect detection apparatuses according to claim 14, wherein more than one points of the first and second defect detection sensitivity data are plotted in coordinate system representing the first defect detection sensitivity data along a first axis and the second defect detection sensitivity data along a second axis, a tilt of an approximation line of the first and second defect detection sensitivity data is computed, and it is determined if the tilt of the approximation line is within a predetermined range, a maintenance of semiconductor device defect inspection apparatuses over time being performed, depending upon the determination.

17. A method of controlling defect detection apparatuses according to claim 14, wherein the first defect detection sensitivity data is fixed with each of more than one defect detection apparatuses in accordance with the method of determining the first detection sensitivity, and the first defect detection sensitivity data is exploited in supervising a state of each of the defect detection apparatuses.

18. A method according to claim 17, wherein the defect detection sensitivity data fixed with each of the defect detection apparatuses is exploited to compute a correlation coefficient of the defect detection sensitivity apparatuses, and it is determined if the correlation coefficient is within a predetermined range, a supervision of a state of the defect detection apparatuses being performed, depending upon the determination.

19. A method according to claim 17, wherein more than one points are plotted in coordinate system representing the defect detection sensitivity data of the different defect detection apparatuses along different axes, respectively, to compute a tilt of approximation line, and it is determined if the tilt of the approximation line is within a predetermined range, a supervision of a state of the defect detection apparatuses being performed, depending upon the determination.

20. A method of detecting defects in semiconductor devices, comprising: exploiting various data to produce a mathematical function expressing a relation of cost of manufacturing the semiconductor devices with parameters of cost factors including semiconductor device defect inspection conditions and influencing the cost, the various data being stored in a processing device database, a yield database, and an electric property database, respectively, the processing device database storing data related to processing devices used in manufacturing semiconductor devices, the yield database storing data related to yields of the semiconductor devices, and the electric property database storing data on the results of a tester inspection and data on the results of the matching of the tester inspection results with the defect information of the semiconductor devices, determining the cost factors through the mathematical function expressing the relation of the cost with the parameters of the cost factors, carrying out the semiconductor device defect inspection, relying on the cost factors and the defect detection sensitivity data fixed by the method of claim 1, producing data on renovated yields from the information on defects detected by the semiconductor device defect inspection and the data on yields stored in the yield database, producing data on renovated results of the matching of the defect information with the results of a tester inspection, and using feedback data of the renovated yield data and the renovated matching result data to repeatedly produce a mathematical function expressing a relation of the cost with the parameters of the cost factors.

21. A method according to claim 20, wherein prior to the semiconductor device defect inspection, a method is applied to supervise the semiconductor defect detection apparatus by exploiting first defect detection sensitivity data determined during a first period of time and second defect detection sensitivity data determined during a second period of time prior to the first period of time, thereby performing a maintenance of semiconductor device defect inspection apparatuses over time.

22. A method according to claim 20, wherein in the context of the mathematical function expressing a relation of the cost with the parameters of the cost factors, the cost factors are fixed at values of the parameters of the cost factors that induces a minimization of the cost.

23. A method according to claim 20, wherein the number of the semiconductor devices that are to be inspected is a requirement in newly producing yield predicting data derived from the data of the renovated yield, and the cost factors are fixed at values of the cost factors added by a certain offset value determined depending upon the requirement in number of the inspected semiconductor devices.

24. A method according to claim 20, wherein the cost factors are fixed at values of the cost factors added by a certain offset value determined depending upon an availability ratio of the defect detection apparatus.

25. A semiconductor device defect detection apparatus, comprising:
a processing device database storing data related to processing devices used in manufacturing semiconductor devices
a yield database storing data related to yields of the semiconductor devices,
an electric property database storing data on the results of a tester inspection and data on the results of the matching of the tester inspection results with the defect information of the semiconductor devices,
a cost calculating unit exploiting the data stored in the processing device database, the yield database, and the electric property database, respectively, to produce a mathematical function expressing a relation of cost of manufacturing the semiconductor devices with parameters of cost factors including semiconductor device defect inspection conditions, said cost factors influencing the cost, and determining the cost factors through the mathematical function expressing the relation of the cost with the parameters of the cost factors,
a semiconductor device defect detection apparatus carrying out the semiconductor device defect inspection, relying on the cost factors and the defect detection sensitivity data fixed by the method of claim 1, and
yield data management unit producing data on renovated yields from the information on defects detected under the defect inspection by the semiconductor device defect detection apparatus and from the data on yields stored in the yield database, producing data on renovated results of the matching of the defect information with the results of a tester inspection, and transferring feedback data of the renovated yields and the renovated matching results to the cost calculating unit.

26. An apparatus of determining defect detection sensitivity data, comprising
an image data pickup unit directing light or electron beam to the desired surface areas of each of semiconductor devices and receiving reflected light or electrons from the desired surface areas to pick up the image data,
a first arithmetic operation unit processing at least two of the image data through arithmetic operations and comparing the processed image data with a parameter of defect detection sensitivity substituted by predetermined threshold data to obtain information on defects in the desired areas at least in one-to-one correspondence with any of the image data arithmetically processed, and repeating more than once the step of varying the parameter of the defect detection sensitivity to obtain the defect information, so as to obtain more than one sets of combination data on a value of the parameter of the defect detection sensitivity correlated with the defect information, and a second arithmetic operation unit processing more than one sets of the combination data to produce a mathematical function expressing a relation of the desired statistical data with the parameter of the defect detection sensitivity, the mathematical function being used to determine defect detection sensitivity data, the defect detection sensitivity data being used in obtaining the information on the defects in the desired surface areas of the semiconductor devices under defect inspection, and the defect detection sensitivity data defining an existence range of the defect information in the image data which are taken from the desired surface areas of each semiconductor device and which are arithmetically processed in the previous step.

* * * * *